(12) United States Patent
Takeda et al.

(10) Patent No.: US 8,379,152 B2
(45) Date of Patent: Feb. 19, 2013

(54) SYSTEMS AND METHODS FOR INCREASING THE TEMPORAL RESOLUTION OF VIDEO DATA

(75) Inventors: Hiroyuki Takeda, Santa Cruz, CA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1080 days.

(21) Appl. No.: 12/060,061

(22) Filed: Mar. 31, 2008

(65) Prior Publication Data
US 2009/0244365 A1   Oct. 1, 2009

(51) Int. Cl.
*H04N 11/02* (2006.01)
*H04N 7/01* (2006.01)
*H04N 5/00* (2006.01)
*H04N 9/64* (2006.01)
*G06K 9/40* (2006.01)

(52) U.S. Cl. ..... 348/607; 348/621; 348/701; 348/439.1; 348/452; 382/254

(58) Field of Classification Search ............... 348/441, 348/451, 624, 475, 439.1, 607, 452, 621, 348/701; 382/254
See application file for complete search history.

(56) References Cited

U.S. PATENT DOCUMENTS

| | | | |
|---|---|---|---|
| 6,438,275 B1* | 8/2002 | Martins et al. | 382/300 |
| 6,654,504 B2* | 11/2003 | Lubin et al. | 382/254 |
| 7,432,986 B2* | 10/2008 | Winger | 348/625 |
| 2002/0031277 A1* | 3/2002 | Lubin et al. | 382/254 |
| 2003/0179213 A1* | 9/2003 | Liu | 345/619 |
| 2004/0252759 A1* | 12/2004 | John Winder et al. | 375/240.12 |
| 2005/0057687 A1* | 3/2005 | Irani et al. | 348/443 |
| 2005/0286764 A1* | 12/2005 | Mittal et al. | 382/181 |
| 2006/0018381 A1* | 1/2006 | Luo et al. | 375/240.16 |
| 2007/0047838 A1* | 3/2007 | Milanfar et al. | 382/289 |
| 2008/0205513 A1* | 8/2008 | Xiong et al. | 375/240.01 |
| 2009/0185078 A1* | 7/2009 | Van Beek et al. | 348/624 |
| 2011/0050991 A1* | 3/2011 | Bellers et al. | 348/441 |

FOREIGN PATENT DOCUMENTS

| | | |
|---|---|---|
| EP | 1843294 | 10/2007 |
| WO | 03060823 | 7/2003 |

OTHER PUBLICATIONS

S.C. Park, M.K. Park, M.G. Kang, "Super-resolution image reconstruction: a technical overview," IEEE Signal Processing Magaine, V. 20, No. 3, May 2003, pp. 21-36.
S. Farsiu, D. Robinson, M. Elad, P. Milanfar, "Advances and Challenges in Super-Resolution," Int. Journal of Imaging Systems and Technology, V. 14, No. 2, Aug. 2004, pp. 47-57.
G. de Haan, "Video scanning format conversion and motion estimation," in: Digital Signal Processing Handbook, eds. V.K. Madisetti and D.B. Williams, CRC Press, 1998, chapter 54.
C. Stiller, J. Konrad, "Estimating motion in image sequences," IEEE Signal Processing Magazine, V. 16, No. 4, Jul. 1999, pp. 70-91.
H. Takeda, S. Farsiu, P. Milanfar, "Kernel Regression for Image Processing and Reconstruction," IEEE Transactions on Image Processing, V. 16, No. 2, Feb. 2007, pp. 349-366.

* cited by examiner

*Primary Examiner* — James R Sheleheda
(74) *Attorney, Agent, or Firm* — Austin Rapp & Hardman

(57) ABSTRACT

A method for multi-scale spatio-temporal steering kernel regression may include repeatedly spatially downsampling input video data, thereby obtaining spatially downsampled video data at a coarsest spatial resolution scale. The spatially downsampled video data at the coarsest spatial resolution scale may be temporally upscaled to generate an estimate of temporally upscaled video data at the coarsest spatial resolution scale. The temporal upscaling may be achieved using spatio-temporal steering kernel regression. Estimates of the temporally upscaled video data may be repeatedly spatially upscaled to generate an estimate of the temporally upscaled video data at the original spatial resolution. The spatial upscaling may be achieved using spatio-temporal steering kernel regression.

33 Claims, 16 Drawing Sheets

SYSTEMS AND METHODS FOR INCREASING THE TEMPORAL RESOLUTION OF VIDEO DATA

TECHNICAL FIELD

The present disclosure relates generally to computers and computer-related technology. More specifically, the present disclosure relates to a framework for processing video signals, i.e., digital image sequences.

BACKGROUND

Currently, very high resolution flat-panel display devices are being developed and brought to market. One example is liquid crystal display (LCD) devices with 4K×2K resolution (2160 lines and 4096 pixels/line). Such display devices are exceeding the highest spatial resolution of video content commonly available, namely 1080 p high definition video (1080 lines and 1920 pixels/line). Thus, it may be desirable to use image and video upscaling or spatial format conversion methods in such display devices.

Recent display devices may also be capable of and benefit from higher frame rates or increased temporal resolution, such as 50, 60, 72, 96 or 120 frames per second. Again, such very high frame rates may exceed the highest frame rate of video content commonly available (24, 25, 30, 50 or 60 frames per second). This highlights the usefulness of temporal video upscaling or temporal video frame rate conversion methods.

Generally, the goals in achieving video interpolation and reconstruction are to enhance or increase the resolution of the input video in a manner that is visually pleasing and artifact-free. Common visual artifacts that may occur in spatial upscaling are edge jaggyness, ringing on edge contours, blurring of edges and blurring of texture detail. Common visual artifacts that may occur in temporal upscaling are motion blur, judder, temporal instability and other motion artifacts. In addition, the input video often may already contain artifacts, for example due to coding and compression or due to other processing stages generally preceding the final processing for display. Therefore, another goal is to avoid amplifying such artifacts in the input signal, and possibly to remove such artifacts.

Due to changing viewing conditions (e.g., closer viewing distances, darker surroundings), as well as incorporation of new display technologies (e.g., larger screens, higher brightness, wider color gamut) in modern flat-panel display devices, any artifacts in the input video as well as any additional artifacts that may be introduced by the scaling or conversion method used are becoming more visible than in the past. This highlights the usefulness of high-quality scaling and format conversion methods as well as other video processing methods, such as noise suppression.

DETAILED DESCRIPTION

Figure 1:
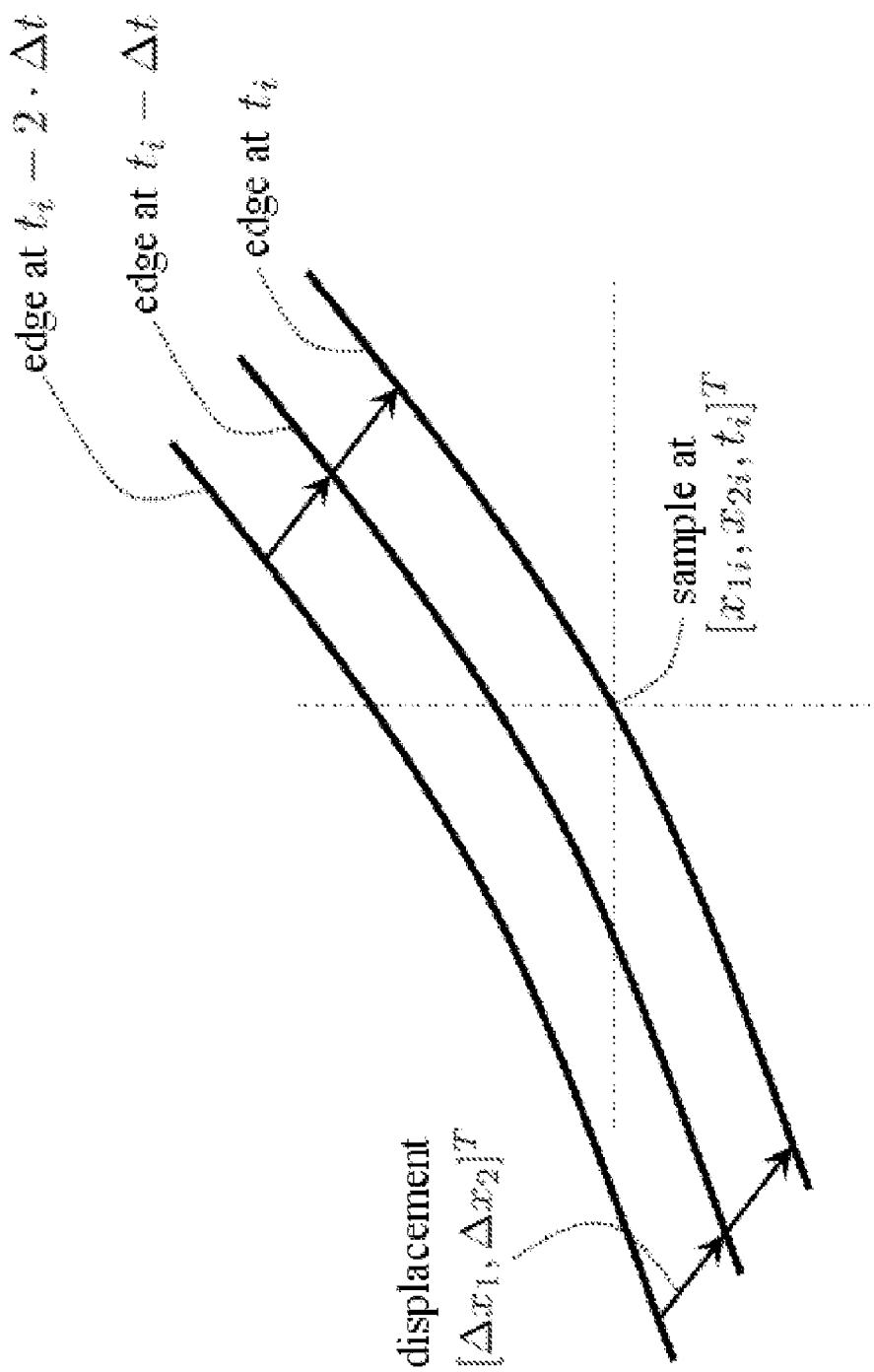
FIG. 1 illustrates a moving edge contour at time $t_i$, time $t_i-\Delta t$ and time $t_i-2\cdot\Delta t$.

Conventional methods for spatial upscaling of digital video apply an interpolation technique to each video frame independently. This class of conventional methods can be referred to as single-frame or intra-frame methods (or intra-field as may be the case in video).

The present disclosure relates to a class of video processing methods that can be referred to as multi-frame or inter-frame (or inter-field) methods, where data from multiple fields/frames of the input video is used to generate each output frame. Using multiple fields/frames of the input video for spatial upscaling may enable improvement of the resolution of the video. Improvement or enhancement of image resolution may be referred to as super-resolution reconstruction.

Super-resolution reconstruction is commonly based on a forward image formation model that includes image motion, optical blur, the sampling process, as well as additive random noise. The performance of the image registration or motion estimation component of a super-resolution algorithm may be important. Difficulties in estimating motion often represent the limiting factor in practical super-resolution. In complicated scenes there can be local object motion, fast object motion, object occlusions, transparent surfaces and other difficulties which have long been difficult to model and/or estimate.

Methods for temporal upscaling usually are multi-frame or inter-frame methods, perhaps excluding the simplest methods such as frame repetition. Early temporal video interpolation (also called video scanning format conversion) methods were based on linear sampling rate conversion theory and include frame repetition, frame averaging and methods based on other linear interpolation filters. These methods suffered from various problems because they ignored the fundamental characteristics of video data. More recent methods are usually motion-adaptive, involving either motion detection or motion estimation. High quality methods are sometimes motion-adaptive as well as edge-adaptive. As above, difficulties in modeling motion as well as estimating motion often limit the performance of existing temporal upscaling methods.

The present disclosure is related to the problem of fast motion when performing multi-frame or spatio-temporal video processing. Fast motion of scene objects causes very large displacements of corresponding pixel-regions in the video from frame to frame. Estimation of such large displacements or fast motion often poses a challenge. For such video data, it may be difficult for many motion estimation methods to achieve high accuracy at a reasonable computational cost.

The present disclosure extends a framework for processing video signals introduced in co-pending U.S. patent application Ser. No. 12/016,119 (hereinafter, the "'119 application"), titled "Systems and Methods for Video Processing Based on Motion-Aligned Spatio-Temporal Steering Kernel Regression," filed Jan. 17, 2008, with inventors Petrus J. L. Van Beek and Hiroyuki Takeda, which is assigned to the assignee of the present disclosure. The framework introduced previously in the '119 application provides methods for interpolation and reconstruction of video signals that may be degraded by noise, blurring and sampling effects. Interpolation includes upscaling in any of the individual spatial and temporal dimensions of the video signal as well as in a joint spatio-temporal manner. Reconstruction includes suppression of noise, such as Gaussian noise, compression artifacts, and other types of noise.

The methods described in the '119 application are based on spatio-temporal steering kernel regression, which utilizes a form of local polynomial approximation of the video data. Kernels that weight video data samples are locally steered according to an analysis of the local spatio-temporal variations of the video data. In particular, in the '119 application, the local analysis determines the local spatial dominant orientation (and its strength) and the local spatio-temporal dominant motion (and its strength). Spatio-temporal weighting kernels are subsequently steered spatially according to the local orientation and steered spatio-temporally according to the local motion. Subsequent motion-aligned steering kernel regression results in spatial and/or temporal upscaling.

Spatio-temporal steering kernel regression will be described first. Then, various extensions to the spatio-temporal steering kernel regression framework will be described.

Initially, a mathematical description of spatio-temporal kernel regression will be provided. Then, data-adaptive spatio-temporal kernel regression will be described, and 2-D data-adaptive kernel regression will be extended to the spatio-temporal (3-D) case. In particular, a description of motion-aligned spatio-temporal steering kernel regression will be provided. Finally, various systems and methods for spatio-temporal video processing based on motion-aligned spatio-temporal steering kernel regression will be described.

For spatio-temporal video processing, a spatio-temporal data model may be defined as:

$$y_i = z(x_i) + \epsilon_i, i = 1, \ldots, P, x_i = [x_{1i}, x_{2i}, t_i]^T, \quad (1)$$

where $y_i$ is a given noisy sample (i.e., pixel value) at pixel location $x_i$, $x_{1i}$ and $x_{2i}$ are the spatial coordinates, $t_i$ is the temporal coordinate, $z(\cdot)$ is the (hitherto unspecified) regression function to be estimated, $\epsilon_i$ is independent and identically-distributed (i.i.d.) zero mean noise, and P is the number of samples in a spatio-temporal neighborhood of interest. This spatio-temporal neighborhood in the video data may include samples, i.e., pixels, from multiple video frames. This model supports a rich framework for computing point-wise estimates of the underlying function $z(\cdot)$ with minimal assumptions about global signal or noise models. The same model can be used for other types of three-dimensional (3-D) data, such as 3-D volumetric data, in which case it may be more appropriate to use the generic notation $x_i = [x_{1i}, x_{2i}, x_{3i}]^T$, i.e., replacing $t_i$ by $x_{3i}$.

With the spatio-temporal data model represented by equation (1), the goal may be to estimate the value of the regression function $z(\cdot)$ at a point x, given the above data samples $y_i$. While the specific form of $z(\cdot)$ may remain unspecified, it is possible to rely on a generic local expansion of the function about the point x. Specifically, if $x_i$ is near the sample at x, the (N+1)-term Taylor series may be given as:

$$z(x_i) = z(x) + \{\nabla z(x)\}^T (x_i - x) + \frac{1}{2}(x_i - x)^T \{\mathcal{H}z(x)\}(x_i - x) + \ldots \quad (2)$$
$$= \beta_0 + \beta_1^T (x_i - x) + \beta_2^T \text{vech}\{(x_i - x)(x_i - x)^T\} + \ldots$$

where $\nabla$ and $\mathcal{H}$ are the spatio-temporal gradient (3×1) and spatio-temporal Hessian (3×3) operators, respectively, and vech($\cdot$) is the half-vectorization operator which lexicographically orders the lower triangular portion of a symmetric matrix into a column-stack vector. Note that x is the location of the sample (pixel) of interest. Furthermore, $\beta_0$ is $z(x)$, which is the pixel value of interest, the vector $\beta_1$ contains first-order partial derivatives of $z(\cdot)$, and $\beta_2$ contains second-order partial derivatives of $z(\cdot)$:

$$\beta_1 = \left[ \frac{\partial z(x)}{\partial x_1}, \frac{\partial z(x)}{\partial x_2}, \frac{\partial z(x)}{\partial t} \right]^T, \quad (3)$$

$$\beta_2 = \left[ \frac{\partial^2 z(x)}{\partial x_1^2}, \frac{\partial^2 z(x)}{\partial x_1 \partial x_2}, \frac{\partial^2 z(x)}{\partial x_1 \partial t}, \frac{\partial^2 z(x)}{\partial x_2^2}, \frac{\partial^2 z(x)}{\partial x_2 \partial t}, \frac{\partial^2 z(x)}{\partial t^2} \right]^T.$$

Again, $\beta_0$ is the pixel value that is being estimated, corresponding to an interpolated pixel value in case the original data did not have a sample at x, or to a reconstructed pixel value in case the original data already had a sample at x, possibly degraded by noise. The first and second partial derivatives at x, contained in the vectors $\beta_1$ and $\beta_2$, can also be estimated as part of the process. Note that alternative representations—other than the Taylor series—are possible and may be advantageous.

When estimating $\{\beta_n\}_{n=0}^N$ from the given samples $\{y_i\}_{i=1}^P$, it may be advantageous to give the nearby samples higher weights than samples farther away, resulting in a local signal representation. A weighted least-squares formulation of the fitting problem capturing this idea is to solve the following optimization problem:

$$\min_{\{\beta_n\}_{n=0}^N} \sum_{i=1}^P \left[ y_i - \beta_0 - \beta_1^T (x_i - x) - \beta_2^T \text{vech}\{(x_i - x)(x_i - x)^T\} - \ldots \right]^2 K_H(x_i - x) \quad (4)$$

$$K_H(x_i - x) = \frac{1}{\det(H)} K(H^{-1}(x_i - x)), \quad (5)$$

where N is the regression order, K($\cdot$) is a kernel function (a radially symmetric function), and H is a (3×3) smoothing matrix which dictates the "footprint" of the kernel function. The influence of H on K will be discussed in more detail later.

The kernel function K(·) weights the influence of each sample (i.e., each pixel). The particular form of the kernel function can be chosen suitably. For example, a Gaussian function may be chosen as a basis for the kernel function. As another example, a rectangular function may be chosen as a prototype for the kernel function. Furthermore, combinations of specific 1-D functions may be chosen to form a spatio-temporal kernel function in multiple dimensions.

It is possible to express equation (4) in matrix form as a weighted least-squares optimization problem:

$$\hat{b} = \underset{b}{\operatorname{argmin}} \|y - X_x b\|_{W_x}^2 \qquad (6)$$
$$= \underset{b}{\operatorname{argmin}} \{(y - X_x b)^T W_x (y - X_x b)\},$$

$$y = [y_1, y_2, \ldots, y_P]^T, b = [\beta_0, \beta_1^T, \ldots, \beta_N^T]^T, \qquad (7)$$

$$W_x = \operatorname{diag}[K_H(x_1 - x), K_H(x_2 - x), \ldots, K_H(x_P - x)]^T, \qquad (8)$$

$$X_x = \begin{bmatrix} 1 & (x_1 - x)^T & \operatorname{vech}^T\{(x_1 - x)(x_1 - x)^T\} & \ldots \\ 1 & (x_2 - x)^T & \operatorname{vech}^T\{(x_2 - x)(x_2 - x)^T\} & \ldots \\ \vdots & \vdots & \vdots & \vdots \\ 1 & (x_P - x)^T & \operatorname{vech}^T\{(x_P - x)(x_P - x)^T\} & \ldots \end{bmatrix}, \qquad (9)$$

with "diag" defining a diagonal matrix. Note that the vector y contains the given data samples from a spatio-temporal neighborhood, a window that spans multiple video frames and contains multiple pixels for each frame.

This approach effectively approximates the local pixel data by a polynomial up to order N. This results in estimates of the value of the regression function and its derivatives at the point x. The primary interest is often to compute estimates of the image (pixel values) alone. In this case, the computations may be limited to the ones that estimate $\beta_0 = z(x)$. Regardless of the regression order and the dimensionality of the regression function, this least-squares estimator may be specified by:

$$\hat{z}(x) = \hat{\beta}_0 = e_1^T (X_x^T W_x X_x)^{-1} X_x^T W_x y, \qquad (10)$$

where $e_1$ is a column vector with the first element equal to one and the rest equal to zero. The estimate of the pixel value of interest results directly from the ($N^{th}$ order) local polynomial approximation.

The estimation process of equation (10) can also be written as:

$$\hat{z}(x) = \sum_{i=1}^{P} W_i(x; K, H, N) y_i, \qquad (11)$$

where $W_i(·)$ may be called the "equivalent" kernel function. This function is based on the kernel function K(·), but it also takes into account the regression order N. This expression illustrates that kernel regression is a local weighted averaging or filtering process. This allows for efficient implementations.

A mathematical description of spatio-temporal kernel regression has just been provided. Next, data-adaptive spatio-temporal kernel regression will be described, and 2-D data-adaptive kernel regression will be extended to the spatio-temporal (3-D) case.

With data-adaptive spatio-temporal kernel functions, the kernel K is locally adapted to the data, based on an analysis of the samples in a local neighborhood. Subsequently, data samples that are believed to be highly correlated to the sample to be estimated are given relatively higher weights, while data samples that are believed to be less correlated to the sample of interest are given lower weights. This may result in greatly improved estimates of interpolated or reconstructed sample (pixel) values.

The motion-aligned steering kernel described herein is designed specifically for spatio-temporal video data. A good choice for steering spatio-temporally may be to consider local motion or optical flow vectors caused by object motion in the scene, in conjunction with spatial steering along local edges and isophotes. It may be desirable for spatial steering to consider the locally dominant orientation of the pixel data and to allow elongation of the kernel in this direction, as well as overall spatial scaling. It may be desirable for spatio-temporal steering to allow alignment with the local optical flow or motion trajectory, as well as overall temporal scaling.

Referring to FIG. 1, consider an edge contour or isophote that is moving at constant velocity $m_i = [m_{1i}, m_{2i}]^T$. The contour is shown at time $t_i$, intersecting the sample (pixel) at $x_i = [x_{1i}, x_{2i}, t_i]^T$, and is shown at two previous instances, at time $t_i - \Delta t$ and at time $t_i - 2 \cdot \Delta t$. These three time instances may correspond to three video frames in a video sequence. Note that later frames may also be available, but were not included in the diagram for simplicity. This illustrates the usefulness of a kernel that is locally aligned with the motion trajectory as well as oriented along spatial edge contours.

Figure 2:
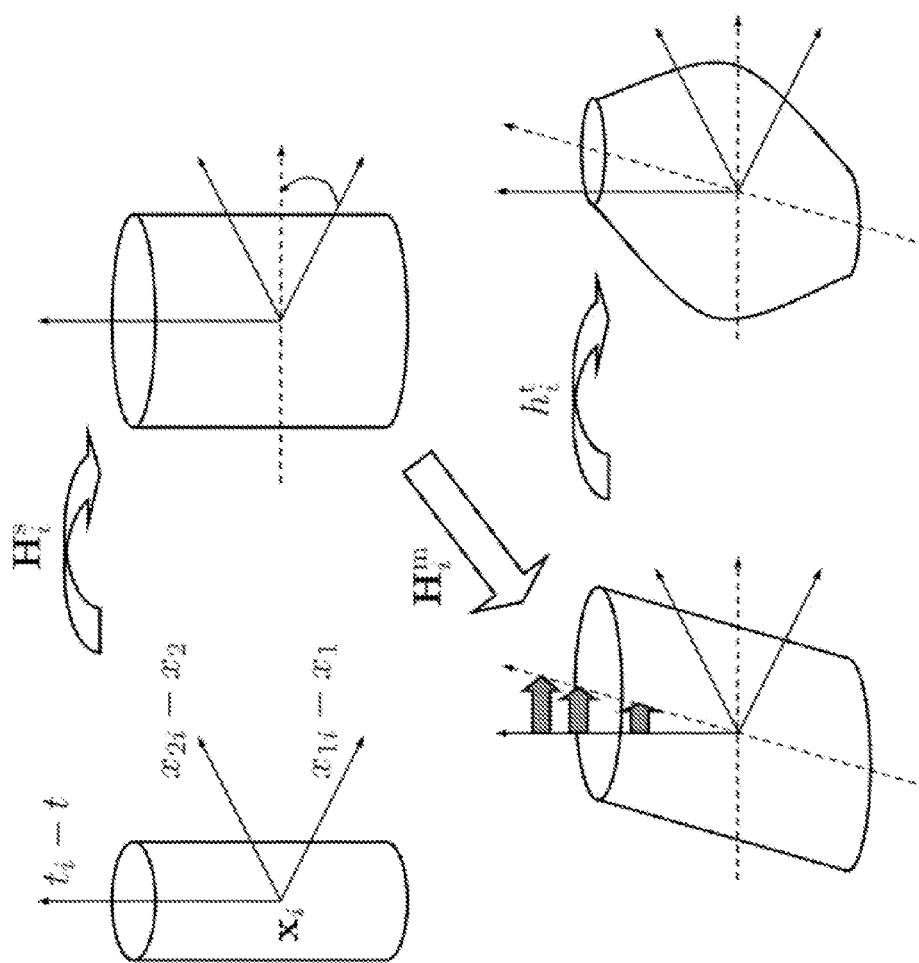
FIG. 2 illustrates a schematic representation of a motion-aligned steering kernel.

A motion-aligned spatio-temporal kernel (MASK) smoothing matrix may be defined as $H^{MASK} = H^s H^m$, where $H^s$ is a 3×3 spatial steering matrix and $H^m$ is a 3×3 motion steering matrix. Referring to FIG. 2, a MASK may be constructed as follows:

$$K_{MASK}(·) \equiv K_H^{MASK}(x_i - x) K_{h_i^t}(t_i - t) \qquad (12)$$

where $h_i^t$ is a temporal steering parameter. These steering matrices (and parameter) are data-dependent, corresponding to the $i^{th}$ sample $x_i$. In other words, the steering kernel function $K_{MASK}(·)$ is adapted to the local data. The overall kernel is a product of a spatial- and a motion-steering kernel, and an optional kernel that acts temporally. The kernel components, determining the steering action, are described in the following.

The spatial steering matrix $H_i^s$ may be defined by:

$$H_i^s = h^s \begin{bmatrix} C_i^s & \\ & 1 \end{bmatrix}^{-\frac{1}{2}}, \qquad (13)$$

where $h^s$ is a global smoothing parameter, and $C_i^s$ is a 2×2 (symmetric) covariance matrix capturing the spatial variations in the sample values in a local neighborhood around sample $x_i$. This matrix may be constructed in a parametric manner on the basis of the following parameters: an orientation angle parameter $\theta_i$ that determines rotation of the kernel in the spatial $(x_1, x_2)$ plane, an elongation parameter $\sigma_i$ that determines spatial elongation of the kernel along its spatial axes, and a scaling parameter $\gamma_i$ that determines local spatial scaling.

The second major component of equation (12), the motion steering matrix $H_i^m$, may be constructed on the basis of a local estimate of the motion vector (or optical flow vector) $m_i = [m_{1i}, m_{2i}]^T$:

$$H_i^m = \begin{bmatrix} 1 & 0 & -m_{1i} \\ 0 & 1 & -m_{2i} \\ 0 & 0 & 0 \end{bmatrix}, \qquad (14)$$

This warps the kernel along the local motion trajectory by a shearing transformation (see FIG. 2). Assuming a spatial kernel was used with elliptical shape, this component by itself results in a spatio-temporal kernel with the shape of a tube of or cylinder with elliptical cross-sections at any time instance t. Also, due to the motion alignment, the center point of each such elliptical cross-section moves in time along the motion path.

The final, optional, component of equation (12) is a temporal kernel that provides temporal penalization. Without this term, different samples that are located exactly on the motion trajectory but in different frames are weighted identically. With this term, data samples from different frames are weighted differently. A natural approach is to weight samples in frames close to the frame containing the sample of interest more strongly and to weight samples in frames that are further away less strongly. The relative temporal extent of the kernel may be controlled by the temporal scaling parameter $h_i^t$. This parameter may be adjusted locally in a data-adaptive manner, based on the estimation of the local motion vector $m_i$. Namely, the parameter can be adapted based on the reliability of the motion vector estimate, or on the basis of a confidence measure related to the motion estimate. For example, one may determine this parameter on the basis of the expected error in the local motion estimate. Or one may determine this parameter on the basis of the strength of the correlation of the data along the estimated motion trajectory.

If the confidence measure indicates high reliability of the motion estimate, the temporal smoothing parameter can be adjusted so that samples (pixels) from frames other than the current frame have a weight that is close to the weight given to samples from the current frame. If, on the other hand, the confidence measure indicates low reliability of the motion estimate, the temporal smoothing parameter can be adjusted so that samples from frames other than the current frame have a smaller weight, and such that the weight decreases more quickly with increasing distance in time. Effectively, this temporal penalization provides a graceful, robust and local fall-back from multi-frame processing to single-frame processing. Temporal support for the estimator can be narrowed in case the data violates the underlying motion model. Such may be the case, for example, in areas of occlusion, in areas with extremely fast motion, or in areas with erratic motion. Alternatively, the temporal smoothing parameter can be controlled globally.

The motion-aligned steering kernel and the action of its components is illustrated in FIG. 2. The top-left portion of FIG. 2 shows an example of the shape of a basic kernel centered on $x_i$. The result of spatial steering with $H_i^s$ is shown in the top-right portion of FIG. 2. The kernel is elongated, scaled and rotated in the spatial dimensions $x_1$ and $x_2$. The result of motion steering with $H_i^m$ is shown in the bottom-left portion of FIG. 2, illustrating the shearing action. Finally, the result of temporal scaling with $h_i^t$ is shown in the bottom-right portion of FIG. 2. Note that FIG. 2 only shows iso-surfaces of the motion-aligned steering kernel in order to illustrate its shape; the actual kernel weights may extend throughout the space and vary in strength.

Figure 3:
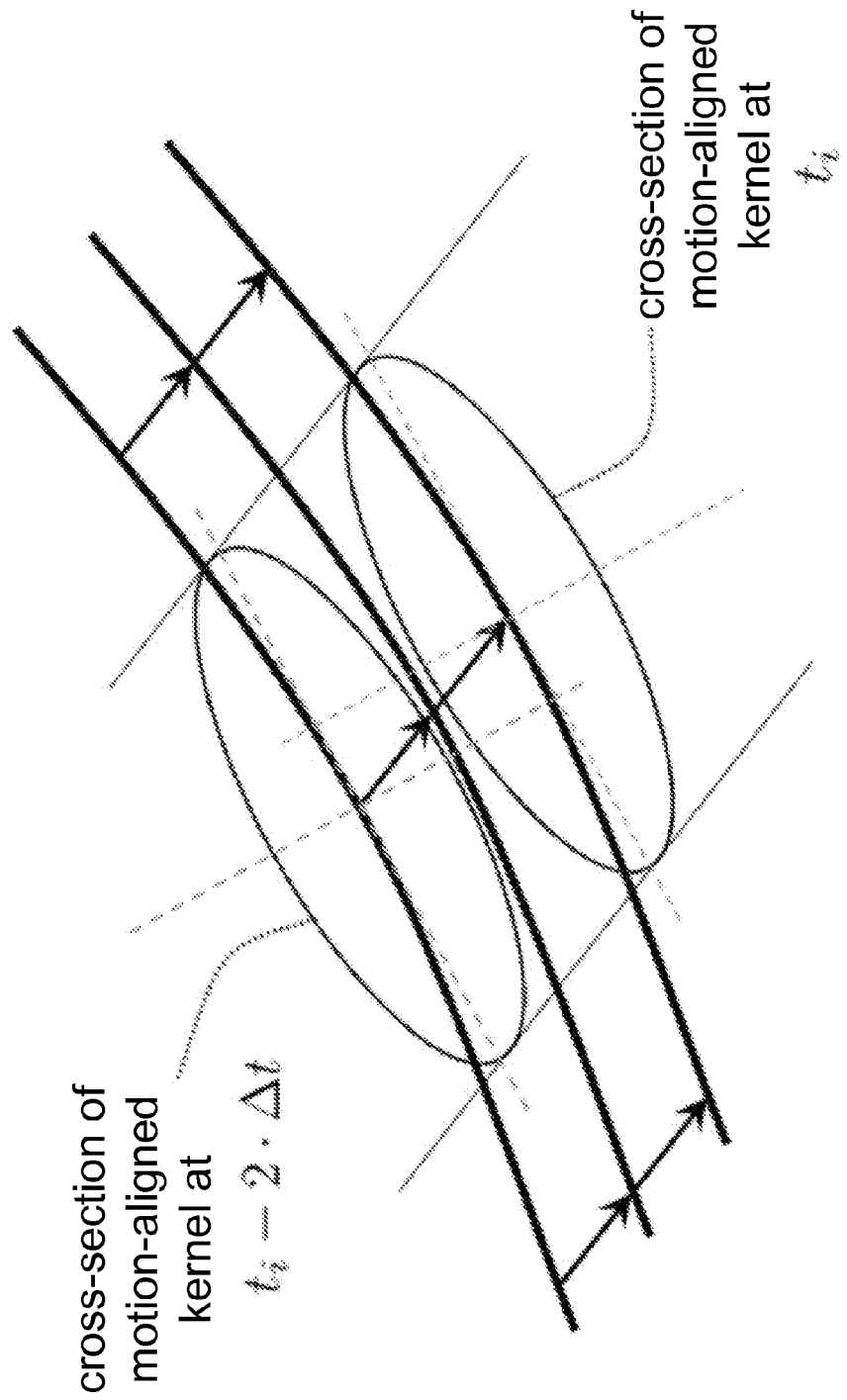
FIG. 3 illustrates the motion-aligned steering kernel in the example of the moving edge of FIG. 1, when spatial steering and motion steering are applied.
Figure 4:
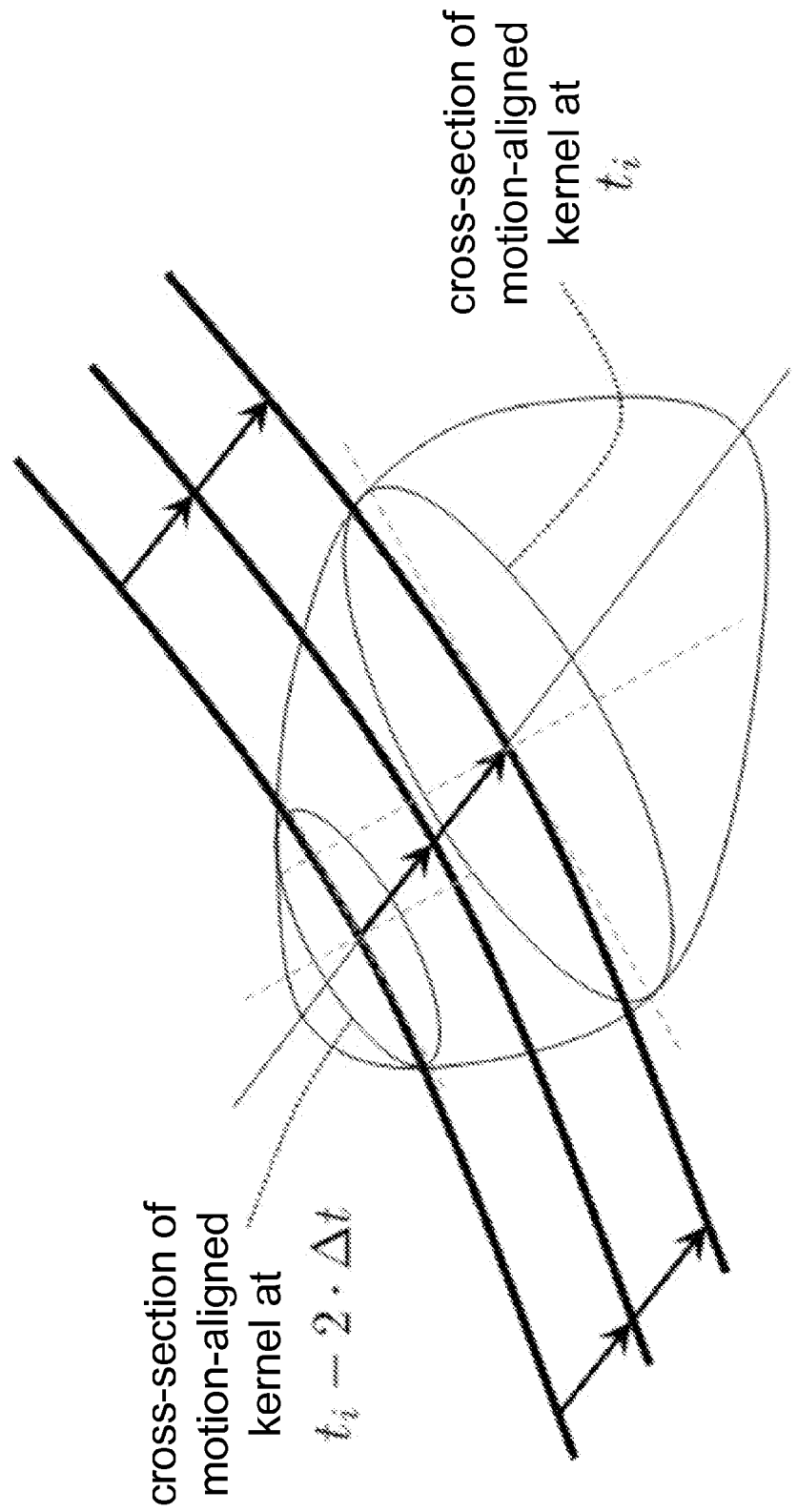
FIG. 4 illustrates the motion-aligned steering kernel in the example of the moving edge of FIG. 1, when spatial steering, motion steering and temporal steering are applied.

Illustrations of the motion-aligned steering kernel in the example of the moving edge of FIG. 1 are shown in FIG. 3 and FIG. 4. FIG. 3 illustrates the kernel when the spatial and motion steering are applied (i.e., without temporal scaling). FIG. 4 illustrates the kernel when the (optional) temporal scaling is applied as well. Note again that these schematic figures only show iso-surfaces and cross-sections of the kernel (not the actual weights). The figures illustrate the case of a strong edge with a dominant orientation in the local pixel data. The example kernel is elongated and rotated in the spatial dimensions so as to spread along the edge contour. This may result in spatially directional noise suppression and directional interpolation of the pixel data. Furthermore, the example kernel is spatio-temporally aligned with the motion trajectory. This may result in a multi-frame estimator, which enables temporal frame rate conversion and can result in spatial resolution enhancement, as well as improved noise suppression. FIG. 4 shows an example kernel with temporal scaling, illustrating local control over the temporal support of the estimator.

The overall motion-aligned kernel $K_{MASK}(\cdot)$ is a product of a spatial- and motion-steering kernel $K_{H_i^s}(H_i^m(x_i-x))$, and a temporal kernel $K_{h_i^t}(t_i-t)$. Each of these kernels can be constructed on the basis of, for example, a Gaussian function, a rectangular function, an exponential function, etc.

The computation of the spatial steering information ($C_i^s$ or $H_i^s$) will now be discussed. Local spatial orientations and variations of the data are captured by the local spatial gradients and their covariance. To this end, let $G_i$ contain local estimates of the spatial gradients. That is:

$$G_i = \begin{bmatrix} \vdots & \vdots \\ \hat{z}_{x_1}(x_j) & \hat{z}_{x_2}(x_j) \\ \vdots & \vdots \end{bmatrix}, x_j \in w_i. \tag{15}$$

where $\hat{z}_{x_1}(x_j)$ and $\hat{z}_{x_2}(x_j)$ are initial estimates of the first derivatives of $z(\cdot)$ along $x_1$ and $x_2$ at samples $x_j$, and $w_i$ is a local analysis window around $x_i$. The analysis window $w_i$ can be a 2-D (single-frame) window; alternatively, $w_i$ can be a 3-D (multi-frame) window. A robust estimate of $C_i^s$ can be computed on the basis of the singular value decomposition (SVD) of $G_i$. This provides the 2×1 (right-)singular vectors $v_{1i}$, $V_{2i}$ and the singular values $s_{1i}$, $s_{2i}$, encoding the local spatial orientation $\theta_i$ and its dominance. Spatial elongation parameters $\sigma_{1i}$ and $\sigma_{2i}$ determine the elongation of the kernel along the $x_1$ and $x_2$ axis, respectively, and may be computed by:

$$\sigma_{1i} = \sigma_{2i}^{-1} = \frac{s_{1i} + \lambda'}{s_{2i} + \lambda'}, \tag{16}$$

where $\lambda'$ is a constant for purposes of regularization. A spatial scaling parameter $\gamma_i$ determines an overall scaling in the spatial dimensions, and may be computed by:

$$\gamma_i = \left(\frac{s_{1i}s_{2i} + \lambda''}{M}\right)^\alpha. \tag{17}$$

M is the number of samples in the local analysis window, $\alpha$ is a local structure sensitivity parameter, and $\lambda''$ is another constant for regularization. Finally, the estimate of the spatial covariance matrix may be expressed as:

$$\hat{C}_i^s = \gamma_i(\sigma_{1i}v_{1i}v_{1i}^T + \sigma_{2i}v_{2i}v_{2i}^T). \tag{18}$$

Alternatively, the spatial orientation, elongation and scale may be computed on the basis of other estimation techniques.

The computation of the motion steering information $H_i^m$ and the temporal steering parameter $h_i^t$ will now be discussed. A variety of different methods for estimating motion (optical flow) may be utilized. It may be desirable for the motion estimation technique that is utilized to provide an estimate of the local motion vector (or optical flow vector) $m_i$ at the given sample locations $x_i$. In addition, it may be desirable for the technique to provide an estimate of the strength or reliability $\rho_i$ of each estimated local motion vector, i.e., a confidence measure may be associated with each motion estimate.

One possible approach is to utilize a gradient-based technique, also called a differential technique. In this technique, motion estimates may be computed from local spatial and temporal derivatives. This may involve solving the following system of constraints:

$$G_i m_i + g_i \approx 0, \quad (19)$$

where $G_i$ contains estimates of spatial derivatives, as defined by equation (15), and $g_i$ contains estimates of temporal derivatives of $z(\cdot)$ in an analysis window $w_i$.

$$g_i = [\hat{z}_t(x_1), \ldots, \hat{z}_t(x_j), \ldots, \hat{z}_t(x_M)]^T, x_j \in w_i. \quad (20)$$

This system of constraints can be solved in the least-squares sense. Furthermore, a confidence measure $\rho_i$ in the estimate can be derived on the basis of the residual error. Subsequently, the temporal scale parameter $h_i^t$ may be determined from $\rho_i$.

Other robust 2-D motion estimation methods may be used as an alternative. For example, so-called block-based methods, such as block-matching, may be used.

Figure 5:
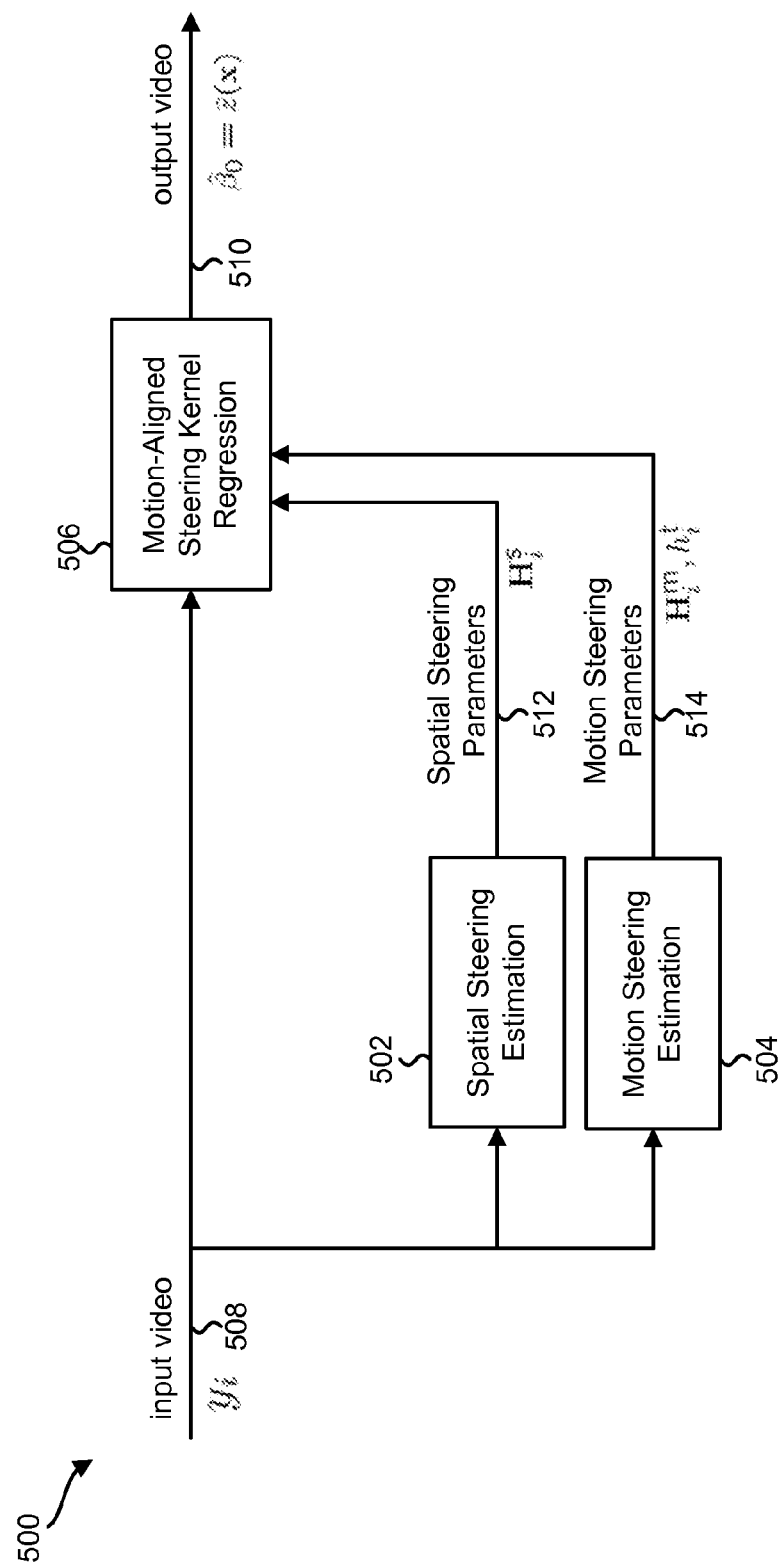
FIG. 5 illustrates a system for spatio-temporal video processing based on motion-aligned spatio-temporal steering kernel regression.

Various systems and methods for spatio-temporal video processing based on motion-aligned spatio-temporal steering kernel regression will be described. Referring initially to FIG. 5, there is shown a system 500 for spatio-temporal video processing based on motion-aligned spatio-temporal steering kernel regression. The system 500 is shown with a spatial steering estimation component 502, a motion steering estimation component 504, and a motion-aligned steering kernel regression component 506.

Input video data 508 may be provided to the spatial steering estimation component 502, the motion steering estimation component 504, and the motion-aligned steering kernel regression component 506. The pixels (samples) in the input video data 508 may correspond to $y_i$ in the mathematical description provided above.

The spatial steering estimation component 502 and the motion steering estimation component 504 may estimate local spatio-temporal steering parameters at pixels in the input video data 508. More specifically, the spatial steering estimation component 502 may estimate spatial steering parameters 512, and the motion steering estimation component 504 may estimate motion steering parameters 514.

The spatial steering parameters 512 may include an angle parameter $\theta_i$ (alternatively represented by singular vectors $v_1$ and $v_2$), elongation parameters $\sigma_{1,i}$ and $\sigma_{2,i}$, and a scaling parameter $\gamma_i$. The local spatial steering parameters 512 at pixel $x_i$ may be captured by a covariance matrix $C_i^s$, which in turn may be used to compute the spatial steering matrix $H_i^s$.

The motion steering (and temporal steering) parameters 514 may include a local motion vector or optical flow vector $m_i = [m_{1,i}, m_{2,i}]^T$ and a temporal scaling parameter $h_i^t$. The motion vector at pixel $x_i$ may be captured by a motion steering matrix $H_i^m$.

The motion-aligned steering kernel regression component 506 may use the spatial steering parameters 512 and the motion steering parameters 514 to apply motion-aligned spatio-temporal steering kernel regression to the input video data 508. This may be done for the purpose of upscaling the input video data 508 and/or performing noise suppression with respect to the input video data 508. Upscaling may be along any dimension, in particular spatially, temporally or spatio-temporally. Motion-aligned spatio-temporal steering kernel regression can be applied to reconstruct data on a regular grid (as is often the case for video upscaling) or on an irregular grid.

The motion-aligned steering kernel regression component 506 may output video data 510 that includes estimated pixel values. The estimated pixel values in the output video data 510 may correspond to $\hat{\beta}_0 = \hat{z}(x)$ in the mathematical description provided above.

Figure 6:
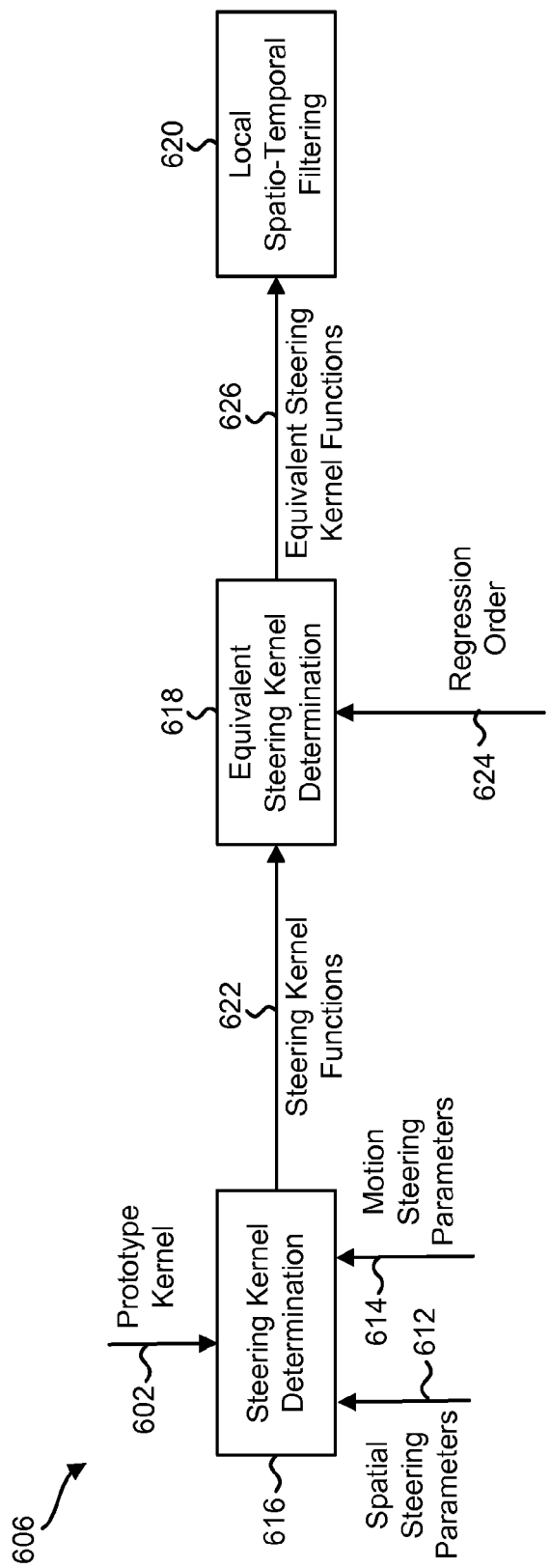
FIG. 6 illustrates a motion-aligned steering kernel regression component.

FIG. 6 illustrates a motion-aligned steering kernel regression component 606. The motion-aligned steering kernel regression component 606 is shown with a steering kernel determination component 616, an equivalent steering kernel determination component 618, and a local spatio-temporal filtering component 620.

The steering kernel determination component 616 may determine steering kernel functions 622 based on a prototype kernel 602, spatial steering parameters 612, and motion steering parameters 614. The steering kernel functions 622 may correspond to $K_{MASK}(\cdot)$ in the above mathematical description.

The equivalent steering kernel determination component 618 may determine equivalent steering kernel functions 626 for pixels in the input video data 508. The equivalent steering kernel functions 626 may be based on the steering kernel function 622 and also based on a regression order 624. The equivalent steering kernel functions 626 may correspond to $W_i(x; H_i^s, H_i^m, h_i^t, K, N)$ in the above mathematical description. The equivalent steering kernel function $W_i(\cdot)$ is specific to the pixel at $x_i$.

The local spatio-temporal filtering component 620 may perform local spatio-temporal filtering of the pixels in the input video data 508 using the equivalent steering kernel functions 626. The local spatio-temporal filtering may be performed in accordance with the following equation:

$$\hat{z}(x) = \sum_{i=1}^{P} W_i(x; H_i^s, H_i^m, h_i^t, K, N) y_i. \quad (21)$$

Figure 7:
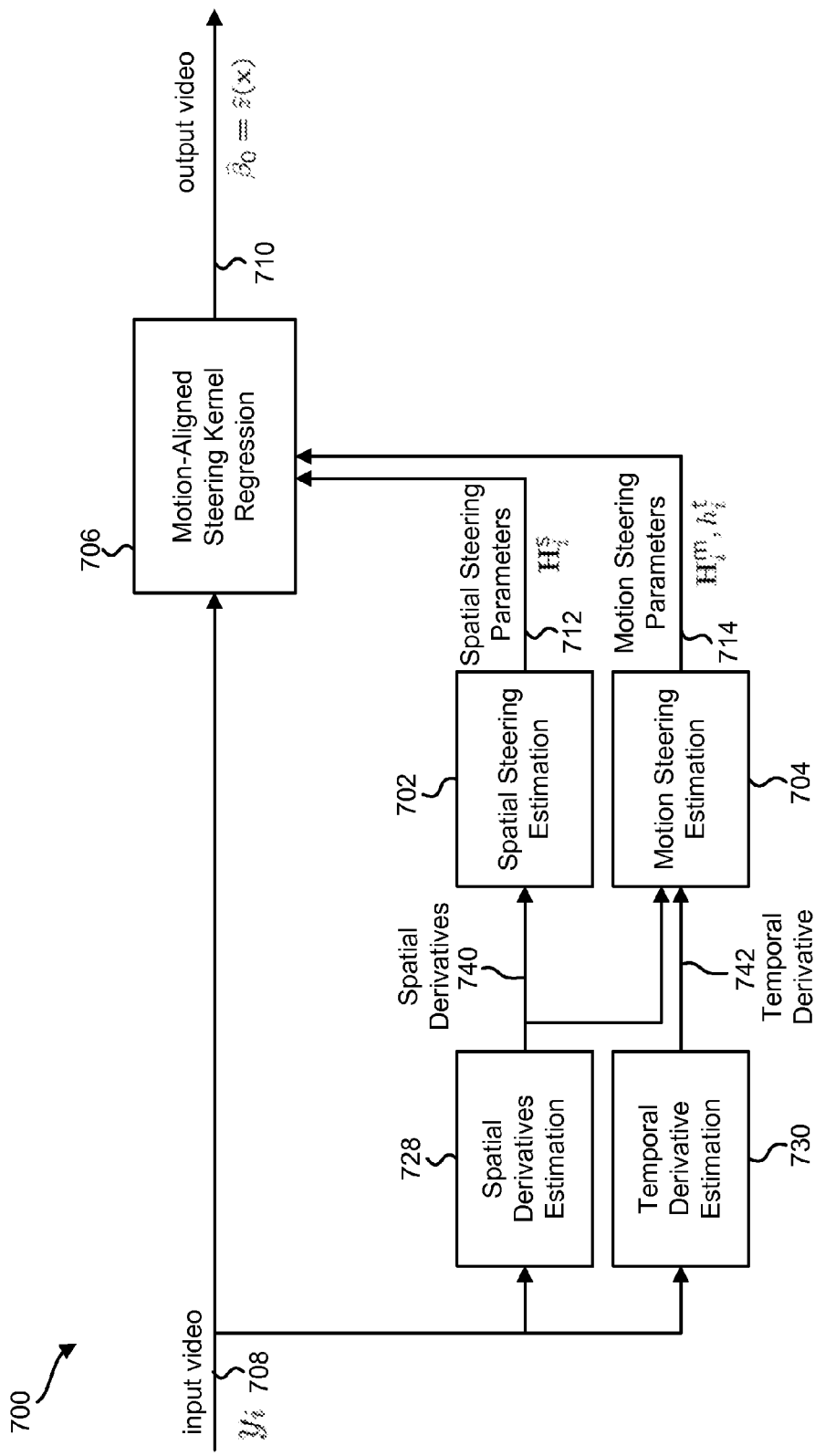
FIG. 7 illustrates another system for spatio-temporal video processing based on motion-aligned spatio-temporal steering kernel regression, where both the spatial steering estimation and the motion steering estimation processes are derivative-based.

FIG. 7 illustrates another system 700 for spatio-temporal video processing based on motion-aligned spatio-temporal steering kernel regression. In the system 700 that is shown in FIG. 7, both the spatial steering estimation and the motion steering estimation processes are derivative-based (e.g., gradient-based or differential) techniques. The system 700 is shown with a spatial derivatives estimation component 728, a temporal derivative estimation component 730, a spatial steering estimation component 702, a motion steering estimation component 704, and a motion-aligned steering kernel regression component 706.

Input video data 708 may be provided to the spatial derivatives estimation component 728. The spatial derivatives estimation component 728 may estimate spatial derivatives 740 with respect to the input video data 708. The spatial derivatives 740 may be provided to the spatial steering estimation component 702 for use in estimating spatial steering parameters 712. The spatial derivatives 740 may also be provided to the motion steering estimation component 704 for use in estimating motion steering parameters 714.

The input video data 708 may also be provided to the temporal derivative estimation component 730. The temporal derivative estimation component 730 may estimate a temporal derivative 742 with respect to the input video data 708. The temporal derivative 742 may be provided to the motion steering estimation component 704 for use in estimating the motion steering parameters 714.

The spatial derivatives 740 and the temporal derivative 742 may be spatio-temporal gradient data $(\hat{z})_{x_1}(\cdot), (\hat{z})_{x_2}(\cdot), (\hat{z})_t(\cdot)$. This gradient estimation process may be based on classic kernel regression (i.e., without steering). This estimation process may alternatively be based on the use of image derivative operators, for example derivative-of-Gaussian filters, or other filters, or other techniques known in the art.

As indicated above, the 2-D spatial steering estimation process may be based on the spatial derivatives 740 (e.g., the spatial gradient data). This may involve applying singular value decomposition (SVD) on the spatial gradient data in a local window. Alternatively, the process may be based on computing or searching for least-squared-error or least-absolute-error estimates of the orientation, or by computing eigenvalues of a matrix, or other techniques, based on the spatial gradient.

As indicated above, the motion steering estimation process may be based on both the spatial derivatives 740 and the temporal derivative 742 (gradient-based). This process may be based on computing or searching for least-squared-error or least-absolute-error estimates of the motion vector, given the samples of the spatio-temporal derivatives in a local window. A confidence measure may be computed and used to control the temporal scaling parameter.

The motion-aligned steering kernel regression component 706 may use the spatial steering parameters 712 and the motion steering parameters 714 to apply motion-aligned spatio-temporal steering kernel regression to the input video data 708. This may be done for the purpose of upscaling the input video data 708 and/or performing noise suppression with respect to the input video data 708. The motion-aligned steering kernel regression component 706 may output video data 710 that includes estimated pixel values.

Optionally, the spatio-temporal steering kernel regression process can compute new estimates of the local spatio-temporal derivatives 740, 742 (in addition to estimates of the pixel values themselves). These new derivative estimates may be improved estimates, because they were calculated using steering. It is then possible to re-estimate (or refine) the previously computed local steering parameters and the steering matrices. These can then be used to apply spatio-temporal steering kernel regression again, to obtain a result that is improved further in terms of visual quality. This procedure can be iterated, which is called iterative steering kernel regression.

The systems and methods described above may be applied to video data, y, consisting of a single component, such as graylevel or intensity data. However, image and video data often consists of multiple color components, such as luminance and chrominance components, or RGB (red, green, blue) color components. In this case, it may be convenient to compute the steering parameters based on a single color component, for example luminance or luma Y. This may then involve a color conversion from RGB data to luminance or luma Y. A suitable conversion matrix may be applied to compute luminance data. Subsequently, spatio-temporal derivatives estimation, spatial steering estimation and motion steering estimation may be applied to the luminance data, to compute steering parameters at each pixel. Finally, motion-aligned steering kernel regression can be applied to each of the red, green and blue components $(y_R, y_G, y_R)$ separately.

Figure 8:
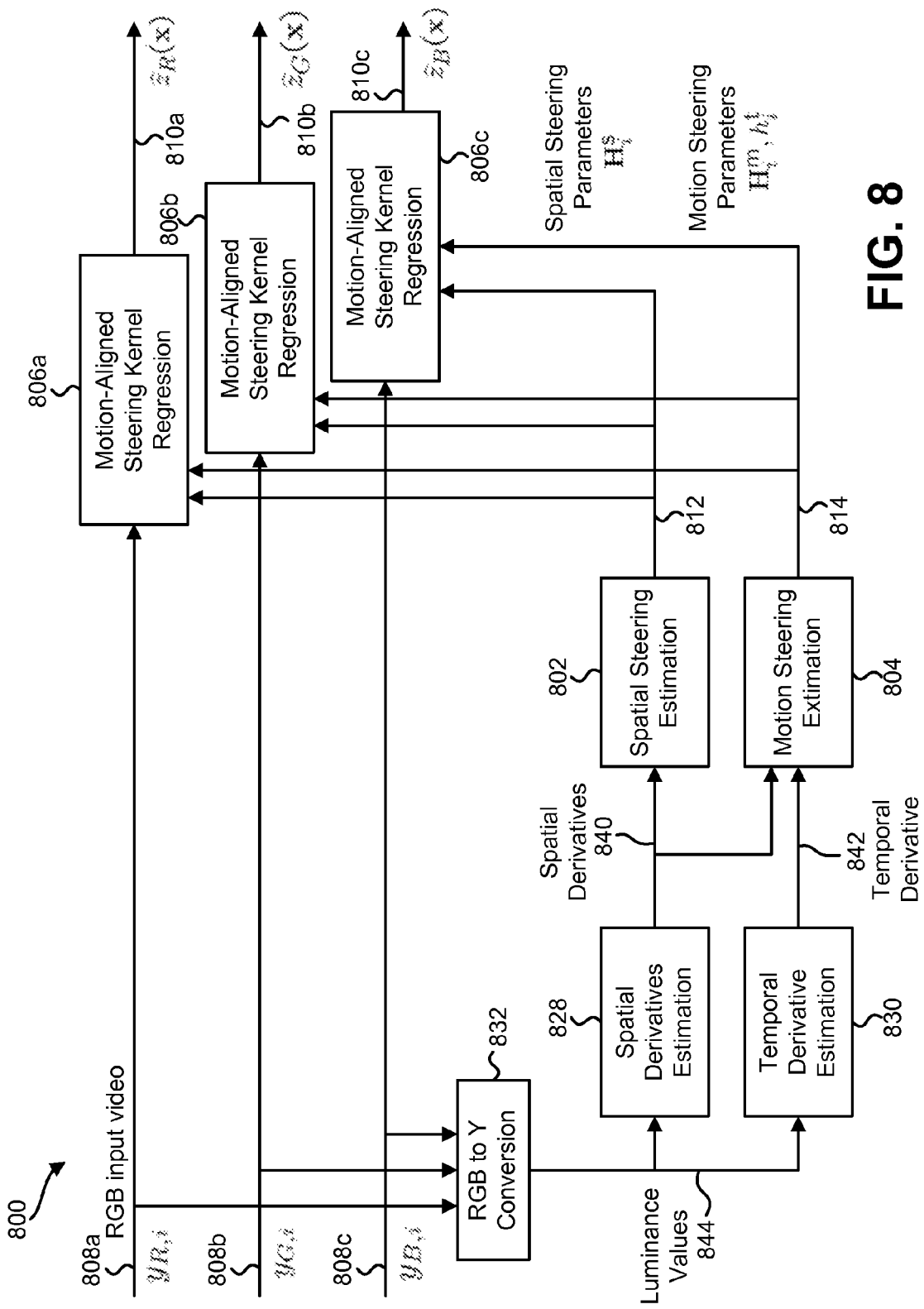
FIG. 8 illustrates a system for spatio-temporal video processing based on motion-aligned spatio-temporal steering kernel regression, where the system may be used to process RGB video data.

FIG. 8 illustrates another system 800 for spatio-temporal video processing based on motion-aligned spatio-temporal steering kernel regression. The depicted system 800 may be used to process RGB video data 808.

The system 800 is shown with a red-green-blue to luminance (RGB-to-Y) conversion component 832, a spatial derivatives estimation component 828, a temporal derivative estimation component 830, a spatial steering estimation component 802, and a motion steering estimation component 804. The system 800 is also shown with first, second, and third motion-aligned steering kernel regression components 806a, 806b, 806c that correspond to a red component 808a, a green component 808b, and a blue component 808c of the RGB video data 808, respectively.

The red component 808a, green component 808b, and blue component 808c of the RGB video data 808 may be provided to the RGB-to-Y conversion component 832. The RGB-to-Y conversion component 832 may convert these components 808a, 808b, 808c of the RGB video data 808 to luminance values 844. The luminance values 844 may be provided to the spatial derivatives estimation component 828 and to the temporal derivative estimation component 830.

The spatial derivatives estimation component 828 may estimate spatial derivatives 840 with respect to the luminance values 844. The spatial derivatives 840 may be provided to the spatial steering estimation component 802 for use in estimating spatial steering parameters 812. The spatial derivatives 840 may also be provided to the motion steering estimation component 804 for use in estimating motion steering parameters 814.

The temporal derivative estimation component 830 may estimate a temporal derivative 842 with respect to the luminance values 844. The temporal derivative 842 may be provided to the motion steering estimation component 804 for use in estimating the motion steering parameters 814.

The first motion-aligned steering kernel regression component 806a may use the spatial steering parameters 812 and the motion steering parameters 814 to apply motion-aligned spatio-temporal steering kernel regression to the red component 808a of the RGB video data 808. The second motion-aligned steering kernel regression component 806b may use the spatial steering parameters 812 and the motion steering parameters 814 to apply motion-aligned spatio-temporal steering kernel regression to the green component 808b of the RGB video data 808. The third motion-aligned steering kernel regression component 806c may use the spatial steering parameters 812 and the motion steering parameters 814 to apply motion-aligned spatio-temporal steering kernel regression to the blue component 808c of the RGB video data 808.

The output of the first motion-aligned steering kernel regression component 806a may be the red component 810a of the output video data 810. The output of the second motion-aligned steering kernel regression component 806b may be the green component 810b of the output video data 810. The output of the third motion-aligned steering kernel regression component 806c may be the blue component 810c of the output video data 810.

As shown in FIG. 8, the same steering parameters 812, 814 can be used for each of the color components. At the same time, the actual steering kernel regression processes themselves for the different color components can be applied independently. This may reduce computational complexity.

Alternatively, the spatio-temporal derivatives estimation and spatio-temporal steering estimation stages can be applied on a component in a different color space, such as Lab, Luv, or other color spaces. Furthermore, in the case where the video data is already available in a suitable color space, such as YCbCr, color conversion may not be necessary. In that case, steering parameter estimation can be performed directly on the luminance data Y; also, final steering kernel regression can be performed separately on the luminance Y and chrominance Cb and Cr components.

Figure 9:
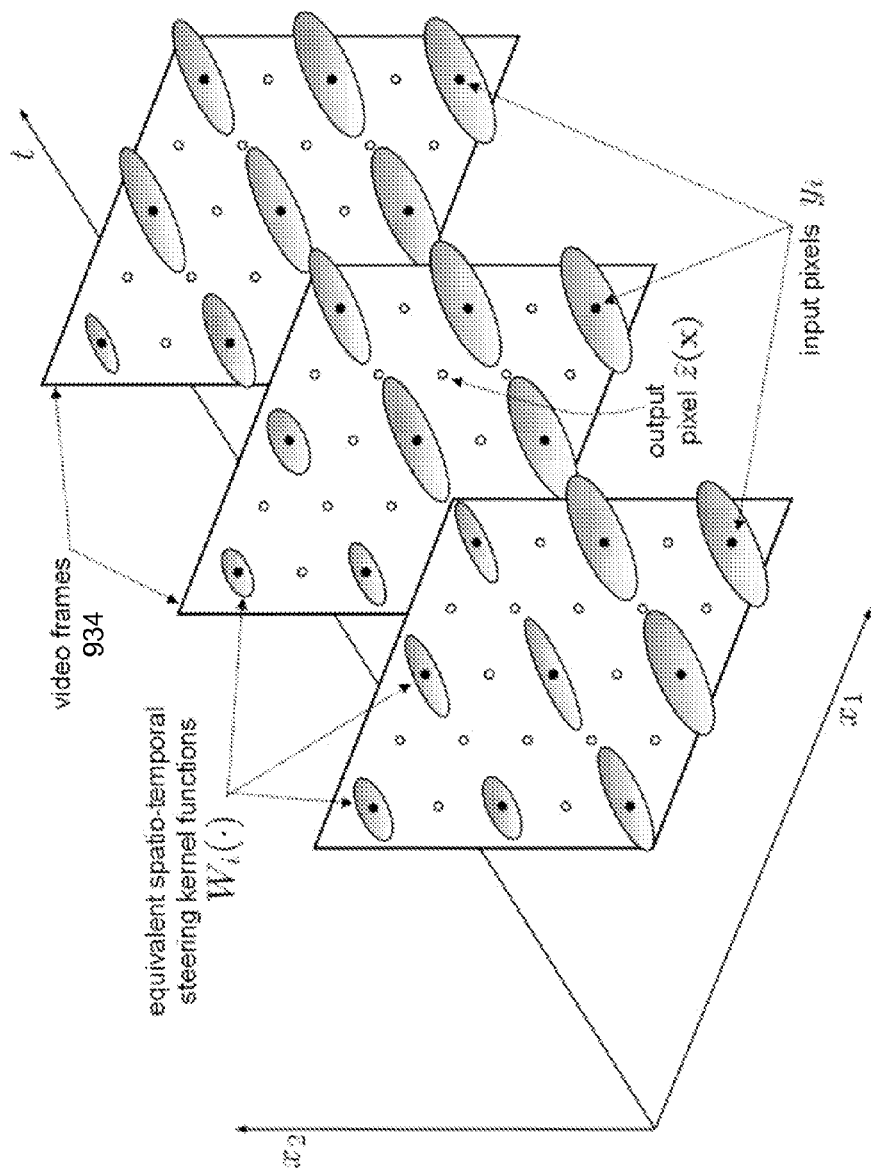
FIG. 9 illustrates an example of motion-aligned spatio-temporal steering kernel regression at the pixel level.

FIG. 9 illustrates an example of motion-aligned spatio-temporal steering kernel regression at the pixel level. This example illustrates the case of spatial upscaling of video data, consisting of a sequence of video frames 934, by a factor of two in each spatial dimension (i.e., horizontally and vertically).

FIG. 9 shows a local view of a small spatio-temporal window of pixels. The locations of input pixels $x_i$ are indicated with solid dots, having pixel values $y_i$. The locations of output pixels that are not in the input are indicated with hollow dots, with output pixel values $\hat{z}(\cdot)$ that may be estimated using interpolation by steering kernel regression. The existing input pixels can also be processed by steering kernel regression, and so these may become output pixels as well.

The final estimated value $\hat{z}(x)$ for the output pixel at x may be a weighted average of pixel values $y_i$ of pixels in a spatio-temporal neighborhood of x. This may include pixels from multiple video frames 934. The weight of each input pixel may be determined by $W_i(x_i-x)$, where $W_i(\cdot)$ is the equivalent motion-aligned steering kernel function associated with the input pixel at $x_i$. This function may be determined by the steering parameters, as well as the regression order N.

The equivalent steering kernel functions are illustrated in FIG. 9 with small ellipses. The ellipses in these diagrams are illustrative only of the approximate shape and orientation of the kernel functions, but not of their actual size. That is, their influence may extend to other pixels; however, the strength of this influence may be strongly adapted and directed using the steering parameters. This may result in giving higher weights to the important pixels in the spatio-temporal neighborhood, while giving lower weights to less important pixels.

Figure 10:
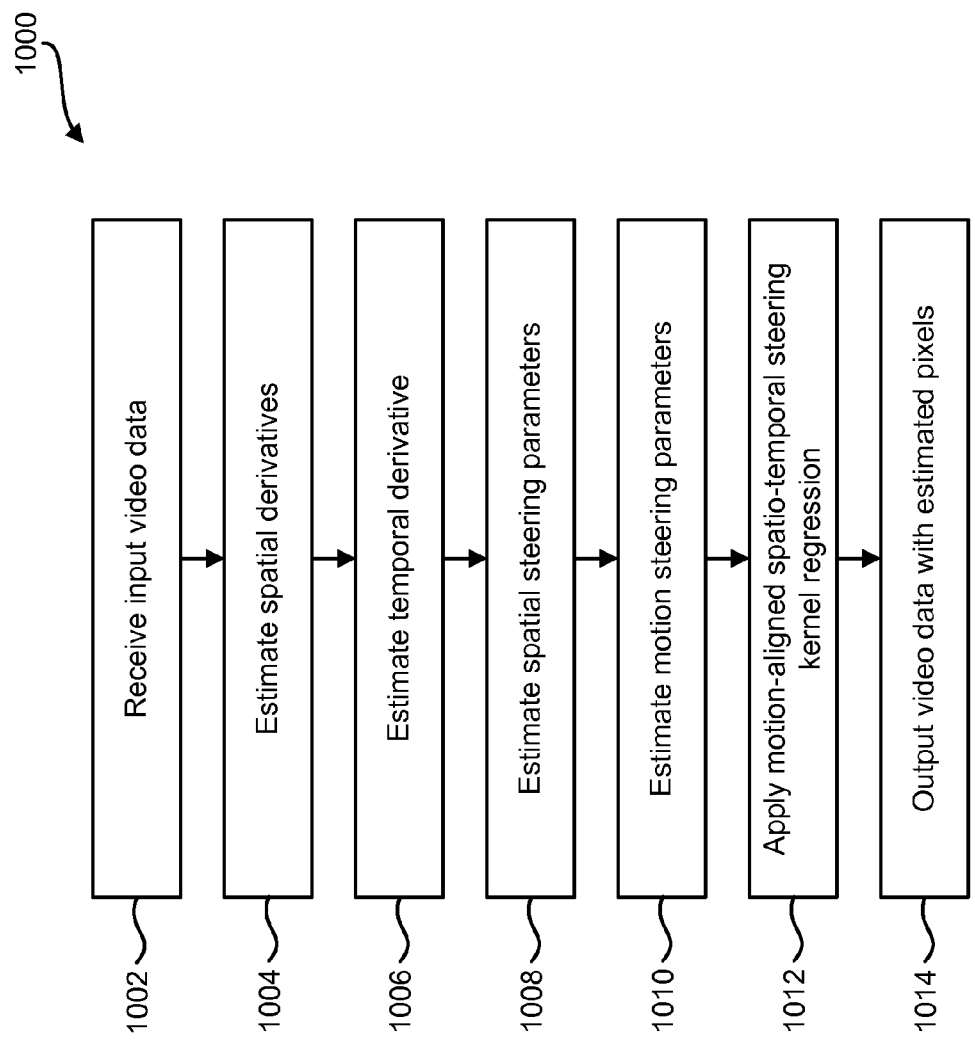
FIG. 10 illustrates a method for spatio-temporal video processing based on motion-aligned spatio-temporal steering kernel regression.

FIG. 10 illustrates a method 1000 for spatio-temporal video processing based on motion-aligned spatio-temporal steering kernel regression. In accordance with the method 1000, input video data 708 may be received 1002. The method 1000 may include estimating 1004 spatial derivatives 740 with respect to the input video data 708. The method 1000 may also include estimating 1006 a temporal derivative 742 with respect to the input video data 708. The spatial derivatives 740 and the temporal derivative 742 may be spatio-temporal gradient data $\hat{z}_{x_1}(\cdot), \hat{z}_{x_2}(\cdot), \hat{z}_t(\cdot)$.

The method 1000 also may include using the spatio-temporal derivatives 740, 742 to estimate local spatio-temporal steering parameters at pixels in the input video data 708. More specifically, spatial steering parameters 712 may be estimated 1008. Motion steering parameters 714 may also be estimated 1010.

The spatial steering estimation process may be based on the spatial derivatives 740. The spatial steering parameters 712 may include an angle parameter $\theta_i$ (alternatively represented by singular vectors $v_1$ and $v_2$), elongation parameters $\sigma_{1,i}$ and $\sigma_{2,i}$, and a scaling parameter $\gamma_i$. The local spatial steering parameters 712 at pixel $x_i$ may be captured by a covariance matrix $C_i^s$, which in turn may be used to compute the spatial steering matrix $H_i^s$.

The motion steering estimation process may be based on both the spatial derivatives 740 and the temporal derivative 742. The motion steering parameters 714 may include a local motion vector or optical flow vector $m_i = [m_{1,i}, m_{2,i}]^T$ and a temporal scaling parameter $h_i^t$. The motion vector at pixel $x_i$ may be captured by a motion steering matrix $H_i^m$.

The spatial steering parameters 712 and the motion steering parameters 714 may be used to apply 1012 motion-aligned spatio-temporal steering kernel regression to the input video data 708. This may be done for the purpose of upscaling the input video data 708 and/or performing noise suppression with respect to the input video data 708. Applying 1012 the motion-aligned spatio-temporal steering kernel regression may involve determining the steering kernel functions 622 ($K_{MASK}(\cdot)$ in the mathematical description provided above) given the steering parameters 712, 714; determining the equivalent steering kernel functions 626 ($W_i(x; H_i^s, H_i^m, h_i^t, K, N)$ in the mathematical description provided above); and finally performing local spatio-temporal filtering of the input video pixels using the equivalent steering kernel functions 626. The final filtering step may be performed in accordance with equation (20) above.

The method 1000 may also include outputting 1014 video data 710 that includes estimated pixel values. The estimated pixel values in the output video data 710 may correspond to $\hat{\beta}_0 = \hat{z}(x)$ in the mathematical description provided above.

A method for temporal upscaling of video data is disclosed herein. The method may include repeatedly spatially downsampling input video data, thereby obtaining spatially downsampled video data at a coarsest spatial resolution scale. The method may also include temporally upscaling the spatially downsampled video data at the coarsest spatial resolution scale to generate an estimate of temporally upscaled video data at the coarsest spatial resolution scale. The method may also include repeatedly spatially upscaling estimates of the temporally upscaled video data to generate an estimate of the temporally upscaled video data at the original spatial resolution.

The temporal upscaling may be achieved using spatio-temporal steering kernel regression. The spatial upscaling may also be achieved using spatio-temporal steering kernel regression.

The spatially downsampled video data at the coarsest spatial resolution scale may be used to estimate steering parameters for the spatio-temporal steering kernel regression that is performed for the temporal upscaling. Estimates of spatio-temporal gradient data may be used to estimate steering parameters for the spatio-temporal steering kernel regression that is performed for the spatial upscaling.

The spatial upscaling may include merging the estimate of the temporally upscaled video data at a particular spatial resolution with the input video data at the next spatial resolution. The spatial upscaling may also include interpolating missing pixels in intermediate frames.

The multi-scale temporal upscaling process may be used as a pre-processing stage to a subsequent upscaling stage. The multi-scale temporal upscaling process may result in estimates of spatio-temporal gradient data. The method may also include using the spatio-temporal gradient data to estimate steering parameters. The method may also include spatially upscaling the estimate of the temporally upscaled video data at the original spatial resolution. The spatial upscaling may be achieved using spatio-temporal steering kernel regression. The estimated steering parameters may be used for the spatio-temporal steering kernel regression.

Alternatively, the method may also include spatially upscaling the input video data. The spatial upscaling may be achieved using spatio-temporal steering kernel regression. The estimated steering parameters may be used for the spatio-temporal steering kernel regression.

The output of the multi-scale temporal upscaling process may be used to estimate motion vectors between frames of the temporally upscaled video data at the original spatial resolution. The method may also include spatially upscaling the estimate of the temporally upscaled video data at the original spatial resolution. The spatial upscaling may be based on multiple video frames, and based on the estimated motion vectors.

Alternatively, the method may also include spatially upscaling the input video data. The spatial upscaling may be based on multiple video frames, and based on the estimated motion vectors.

A computer system that is configured for temporal upscaling of video data is also disclosed herein. The computer system includes a processor and memory in electronic communication with the processor. Instructions are stored in the memory. The instructions may be executable to repeatedly spatially downsample input video data, thereby obtaining spatially downsampled video data at a coarsest spatial resolution scale. The instructions may also be executable to temporally upscale the spatially downsampled video data at the coarsest spatial resolution scale to generate an estimate of temporally upscaled video data at the coarsest spatial resolution scale. The instructions may also be executable to repeatedly spatially upscale estimates of the temporally upscaled video data to generate an estimate of the temporally upscaled video data at the original spatial resolution.

A computer-readable medium that facilitates temporal upscaling of video data is also disclosed herein. The computer-readable medium may include executable instructions for repeatedly spatially downsampling input video data, thereby obtaining spatially downsampled video data at a coarsest spatial resolution scale. The computer-readable medium may also include executable instructions for temporally upscaling the spatially downsampled video data at the coarsest spatial resolution scale to generate an estimate of temporally upscaled video data at the coarsest spatial resolution scale. The computer-readable medium may also include executable instructions for repeatedly spatially upscaling estimates of the temporally upscaled video data to generate an estimate of the temporally upscaled video data at the original spatial resolution.

A novel pre-processing stage to the main steering kernel regression (upscaling) stage is disclosed herein. The pre-processing stage provides temporally upscaled video data based on the input video data, i.e., the pre-processing stage generates new intermediate video frames. One potential benefit of this temporally upscaled video sequence is that it may allow more accurate estimation of the steering parameters, in particular the motion parameters. This pre-processing output video sequence (with increased frame rate) may be generated irrespective of whether the final steering kernel regression (upscaling) stage includes temporal upscaling. For example, it may be generated even if the final steering kernel regression stage outputs spatial upscaling only.

In addition, a novel multi-scale or multi-resolution method for temporal upscaling of a video sequence based entirely on the spatio-temporal steering kernel regression framework is disclosed herein. This method may involve repeated reduction of spatial resolution and spatial downsampling of the input video frames; temporal upscaling of the video data at the coarsest resolution scale; and repeated spatio-temporal interpolation and reconstruction of video data from the coarsest resolution scale up to the finest resolution scale. At each resolution scale, spatio-temporal steering kernel regression may be used to estimate video data samples as well as local video data gradients.

In addition, a novel multi-scale method for estimation of 2-D motion in a video sequence is disclosed herein. The techniques described can be used for motion estimation with improved accuracy, which may be a very valuable video processing tool in itself. Namely, motion estimation is often needed and used in many video processing tasks, such as restoration, analysis, compression, filtering, computer vision, etc.

As discussed above, computation of the spatial and spatio-temporal (motion) steering parameters may be based on estimating spatial and spatio-temporal gradients of the video data. Computation of spatio-temporal gradients and steering parameters can be very challenging in video due to the presence of objects in the scene with fast motion. Fast motion of scene objects cause very large displacements of pixels or pixel-regions in the video from frame to frame. The magnitudes of the displacements expressed in pixels depend on the spatial and temporal resolution of the source video data. The problem can become more difficult in high-definition video, where frame-to-frame displacements in the range of 16 pixels are not uncommon. Such large displacements are very hard to estimate or detect using a local analysis approach. This is a kind of aperture problem, where aperture in this case refers to the spatial extent of the analysis window.

Figure 11:
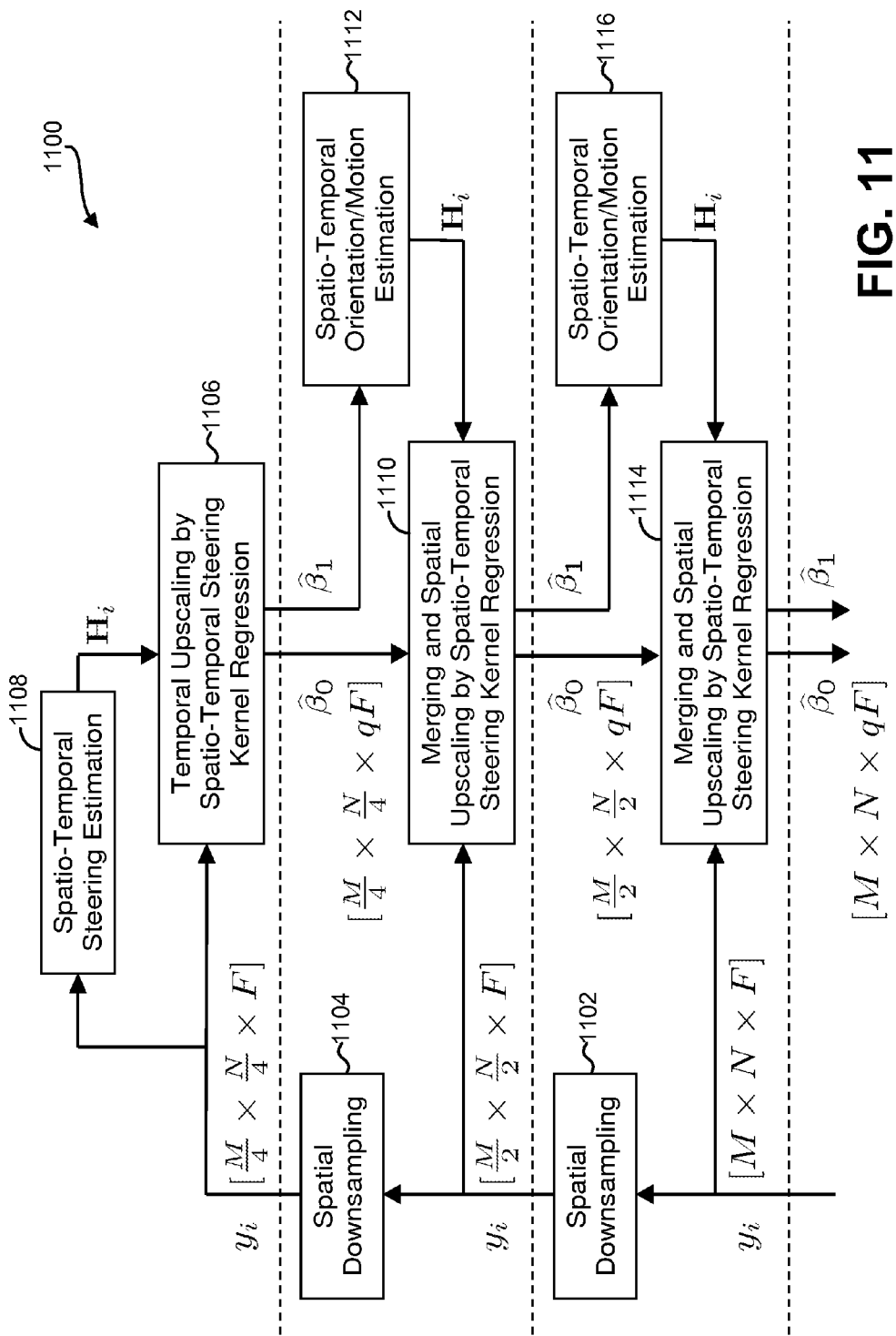
FIG. 11 illustrates a method for multi-scale spatio-temporal steering kernel regression.

FIG. 11 illustrates a method 1100 for multi-scale spatio-temporal steering kernel regression. This method 1100 involves repeated reduction of spatial resolution and spatial downsampling of the input video frames; temporal upscaling of the video data at the coarsest resolution scale; and repeated spatio-temporal interpolation and reconstruction of video data from the coarsest resolution scale up to the finest resolution scale. At each resolution scale, spatio-temporal steering kernel regression is used to estimate video data samples as well as local video data gradients. In the depicted method 1100, the estimated data samples as well as gradients of newly generated intermediate video frames are propagated from coarser scales to finer scales. In the depicted method 1100, motion estimates are not propagated from coarser to finer scales.

To indicate the resolution of the data at any stage of the method 1100, we use the notation M×N×F, where M and N refer to the spatial resolution of each video frame and F refers to the temporal resolution of the video sequence. For example, M and N may refer to the number of lines and number of pixels in each line (height and width of each video frame). Alternatively, M and N could refer to a block or portion within a frame. Also, F may simply refer to the frame rate (e.g., 60 frames per second), or, alternatively, a number of frames within a time interval.

As shown on the left side of FIG. 11, the input to the method 1100 is video data $y_i$ (multiple frames), with resolution M×N×F. This data is spatially downsampled by a factor of 2 repeatedly (also shown on the left). First the data is downsampled 1102 to a resolution of $$\frac{M}{2} \times \frac{N}{2} \times F$$

at a first coarser scale, and then the data is downsampled 1104 to a resolution of $$\frac{M}{4} \times \frac{N}{4} \times F$$

at a second coarser scale. In this example, the second coarser scale is also the coarsest scale used, resulting in processing at three spatial resolution scales. However, fewer or more scales may be used in accordance with the present disclosure.

Figure 12:
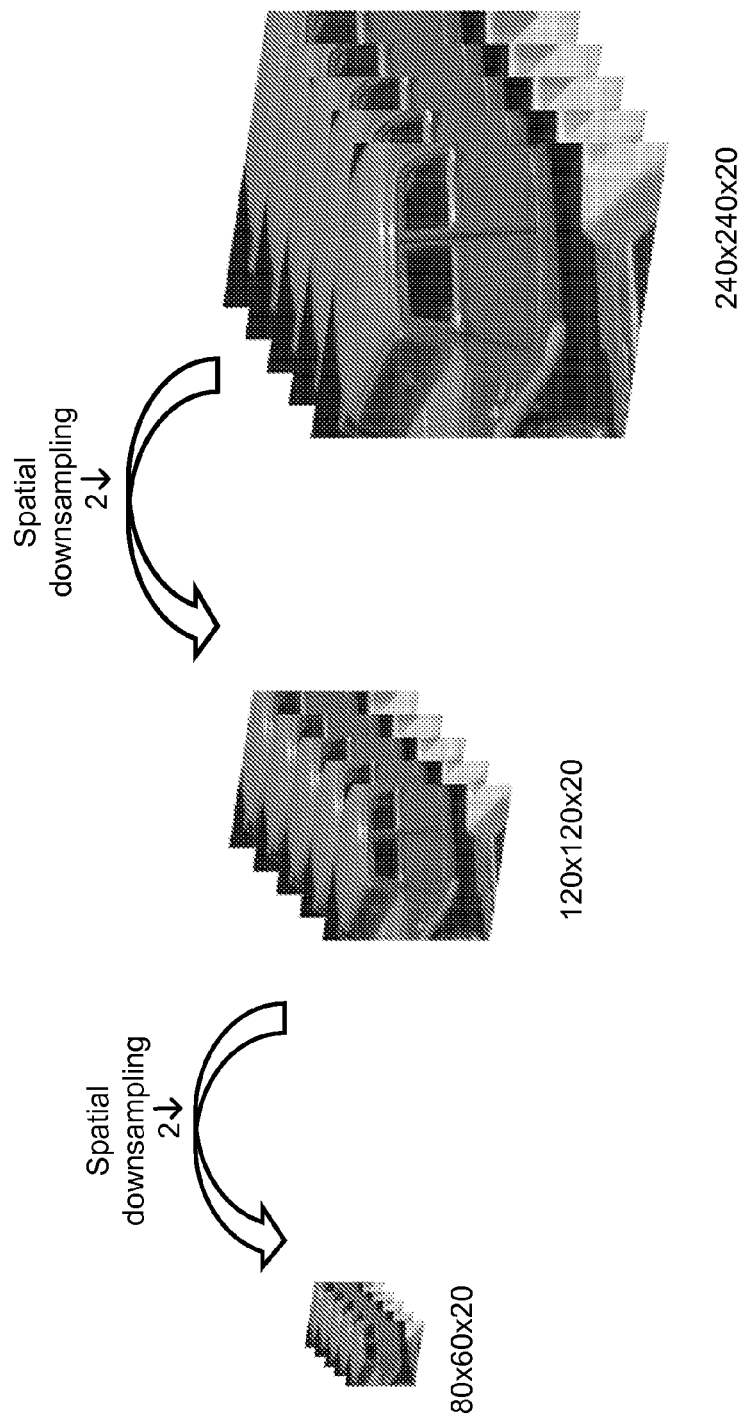
FIG. 12 illustrates repeated downsampling of video data.

The process of repeated downsampling is also illustrated in FIG. 12. Conceptually, the process can be seen to generate a kind of data pyramid. During the downsampling process, traditional pre-filtering may or may not be applied. It may be advantageous to avoid pre-filtering, or pre-filter less strongly, in order to preserve more details.

As shown at the top in FIG. 11, a first regression process starts at the coarsest resolution scale. That is, spatio-temporal (multi-frame) steering kernel regression 1106 is applied to generate temporally interpolated intermediate video frames. This process is based on 3-D or spatio-temporal steering matrices $H_i$, determined by a steering parameter estimation step 1108.

The shorthand $H_i$ is used here to indicate all 3-D or spatio-temporal steering parameters. For example, in the case of the motion-aligned spatio-temporal steering kernel as described above, this includes the spatial orientation parameters captured by $H_i^s$ and the motion parameters captured by $H_i^m$. In particular, this may include estimation of motion vectors $m_i = [m_{1,i}, m_{2,i}]^T$.

At this coarse scale, displacements due to motion have become relatively smaller (in number of pixels) and can be estimated more accurately. The steering parameter estimation process 1108 itself may consist of two sub-steps, as described above. For example, this may involve determining initial estimates of spatial and temporal derivatives, followed by gradient-based orientation estimation and gradient-based motion (optical flow) estimation.

Estimates of the temporally upscaled video data, $\hat{\beta}_0$, and its first derivatives (gradients) $\hat{\beta}_1$ are output from the temporal upscaling stage 1106. The resolution of the data at this point is $$\frac{M}{4} \times \frac{N}{4} \times qF.$$

Here, q denotes the temporal upscaling factor used in the overall multi-scale procedure.

Subsequently, shown in the center of FIG. 11, this data is upscaled spatially, using spatio-temporal (multi-frame) steering kernel regression 1110. This increases the spatial resolution from $$\frac{M}{4} \times \frac{N}{4} \times qF \text{ to } \frac{M}{2} \times \frac{N}{2} \times qF.$$

This stage 1110 also uses the input data at the resolution $$\frac{M}{2} \times \frac{N}{2} \times F,$$

which represents the original frames at this scale. More precisely, $\hat{\beta}_0$ with resolution $$\frac{M}{4} \times \frac{N}{4} \times qF$$

is first merged 1110 with input data $y_i$ at the next spatial resolution $$\frac{M}{2} \times \frac{N}{2} \times F;$$

subsequently, steering kernel regression 1110 is applied to interpolate missing pixels in the intermediate frames. Steering kernel regression 1110 is based on estimates of (spatial) orientation and (spatio-temporal) motion steering parameters. As shown on the right in FIG. 11, this estimation 1112 is based directly on estimates of the gradients $\hat{\beta}_1$ generated at the previous scale.

The latter stage is repeated, spatially upscaling the data from resolution $$\frac{M}{2} \times \frac{N}{2} \times qF \text{ to } M \times N \times qF.$$

In particular, the data is upscaled spatially, using spatio-temporal (multi-frame) steering kernel regression 1114. Steering kernel regression 1114 is based on estimates of (spatial) orientation and (spatio-temporal) motion steering parameters. This estimation 1116 is based directly on estimates of the gradients $\hat{\beta}_1$ generated at the previous scale.

The depicted method 1100 generates an estimate of the video data $\hat{\beta}_0$ at the original spatial resolution, but with increased temporal resolution (qF). Also, the depicted method 1100 generates estimates of the gradients (derivatives) $\hat{\beta}_1$ at this resolution M×N×qF. These estimates will be used in further spatial and/or temporal upscaling, as will be described later.

Figure 13:
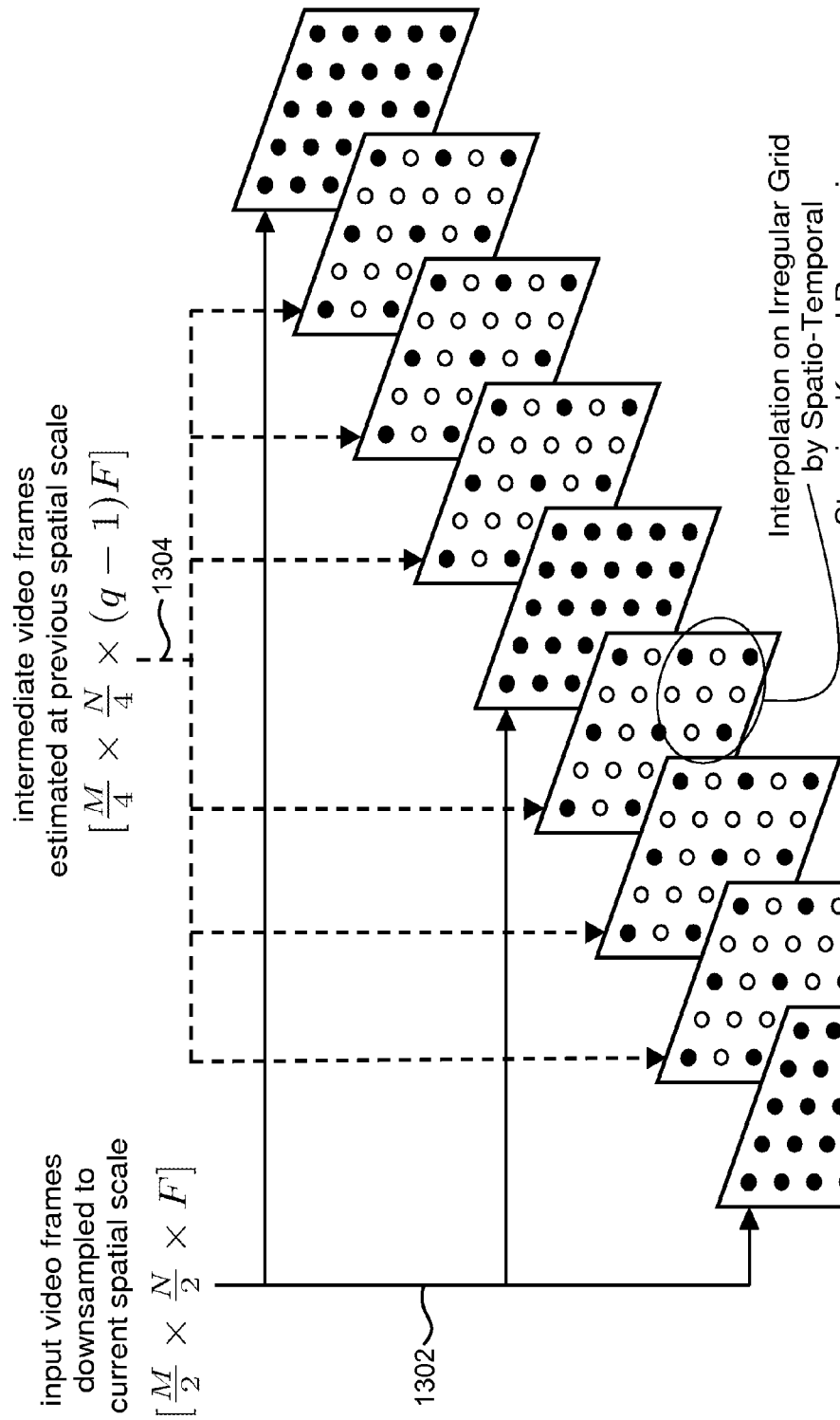
FIG. 13 illustrates the spatial upscaling steps in the multi-scale spatio-temporal steering kernel regression method of FIG. 11.

A more detailed view of the data as processed in the spatial upscaling steps is shown in FIG. 13. As described above, estimates of the data from a previous (coarser) resolution scale are available at the resolution $$\frac{M}{4} \times \frac{N}{4} \times qF.$$

This includes temporally interpolated intermediate video frames 1304. In order to spatially upscale this data to the next (finer) resolution $$\frac{M}{2} \times \frac{N}{2} \times qF,$$

we can take advantage of the fact that for some of the video frames we already have a good estimate at that resolution, namely the input video frames 1302 downsampled to that scale $$\left(\frac{M}{2} \times \frac{N}{2} \times F\right).$$

In FIG. 13, solid dots represent given pixels, while circles represent "missing" pixels.

To interpolate the missing pixels in the intermediate frames 1304, the estimated data from the previous scale may be merged with the input data at the next scale. For every q frames available from the previous (coarser) resolution scale, we effectively replace one by its counterpart from the input. Hence, we only use q−1 frames out of q frames estimated at the previous scale. The subsequent upscaling step actually performs interpolation on an irregular grid, as shown in FIG. 13. This may be performed by multi-frame spatio-temporal steering kernel regression.

Two new systems for spatial and temporal video upscaling are disclosed herein. Both of these systems are based on multi-scale spatio-temporal steering kernel regression. In both of the proposed systems, the multi-scale steering kernel regression process as described by FIG. 11 acts as a pre-processing stage to the main (final) upscaling stage. The main upscaling stage may also be performed by spatio-temporal steering kernel regression. The pre-processing stage provides temporally upscaled video data based on the input video data, i.e., the pre-processing stage generates new intermediate video frames. One potential benefit of this temporally upscaled video sequence is that it may allow more accurate estimation of the steering parameters, in particular the motion parameters. This pre-processing output video sequence (with increased frame rate) may be generated irrespective of whether the final steering kernel regression (upscaling) stage includes temporal upscaling. For example, it may be generated even if the final steering kernel regression stage outputs spatial upscaling only.

Figure 14:
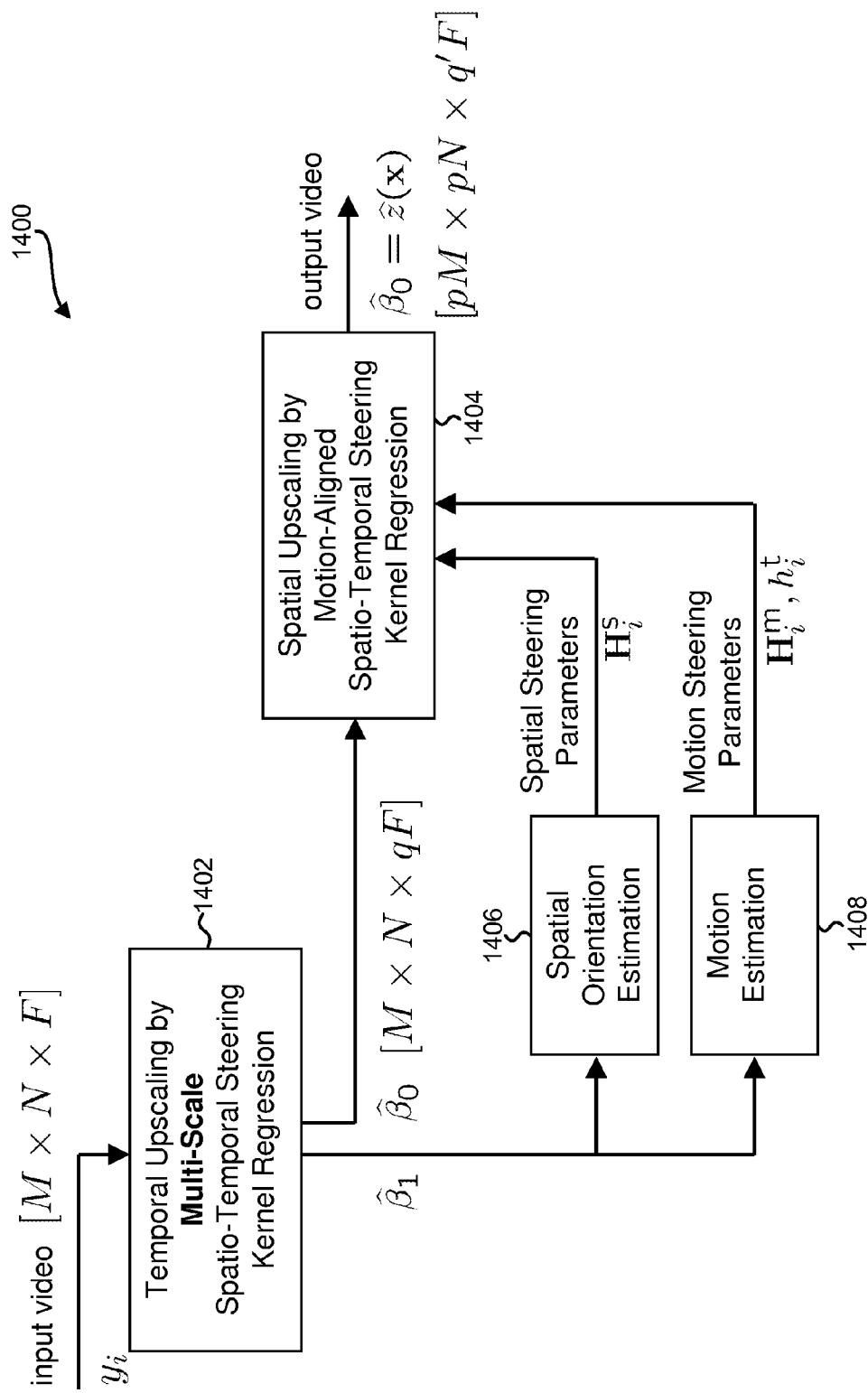
FIG. 14 illustrates a system for spatial and temporal video upscaling based on multi-scale spatio-temporal steering kernel regression.

The first upscaling system 1400 is shown in FIG. 14. The input video $y_i$, at resolution M×N×F, is shown at the top-left. Multi-scale spatio-temporal steering kernel regression 1402, as described above, may be used to perform temporal upscaling of the input video. This may generate estimates of the video data $\hat{\beta}_0$ as well as estimates of the gradients (derivatives) $\hat{\beta}_1$ at resolution M×N×qF.

Subsequently, the estimated video data $\hat{\beta}_0$ are spatially upscaled, based on single-scale (multi-frame) spatio-temporal steering kernel regression 1404. This final processing stage may result in an output video with resolution pM×pN×q'F, where p is the desired spatial upscaling factor and $q' \leq q$ is the desired temporal upscaling factor. For example, p=2 for upscaling by a factor of 2 both horizontally and vertically.

The final upscaling stage 1404 performs only spatial upscaling, but may output a video sequence that is temporally upscaled with respect to the original input. For example, when q'=q, this means that all the frames generated by the multi-scale temporal upscaling pre-processing stage 1402 are also spatially upscaled by the final kernel regression stage 1404. However, if temporal upscaling of the input video is ultimately not needed at the final output, the final stage 1404 will simply apply spatial upscaling to a subset of the video frames that are provided by the multi-scale pre-processing stage 1402. This corresponds to q'=1. The final output video may also have a temporal resolution increase between 1 and q.

In all these cases, the temporal upscaling performed by the pre-processing stage 1402 is of value, because it allows more accurate estimation of temporal gradients and motion vectors. As shown in FIG. 14, the final spatial upscaling stage, as it is based on steering kernel regression, needs steering parameters as its input. The steering parameters, both (spatial) orientation and (spatio-temporal) motion, are estimated directly from the derivative information $\hat{\beta}_1$ generated by the multi-scale pre-processing stage 1402, using gradient-based methods as described above. A component 1406 for performing spatial orientation estimation and a component 1408 for performing motion estimation are shown in FIG. 14. Note that the orientation estimation component 1406 only needs the spatial derivatives (in the $x_1$ and $x_2$ directions), while the motion estimation component 1408 needs both spatial derivatives and the temporal derivative (in the t direction).

Figure 15:
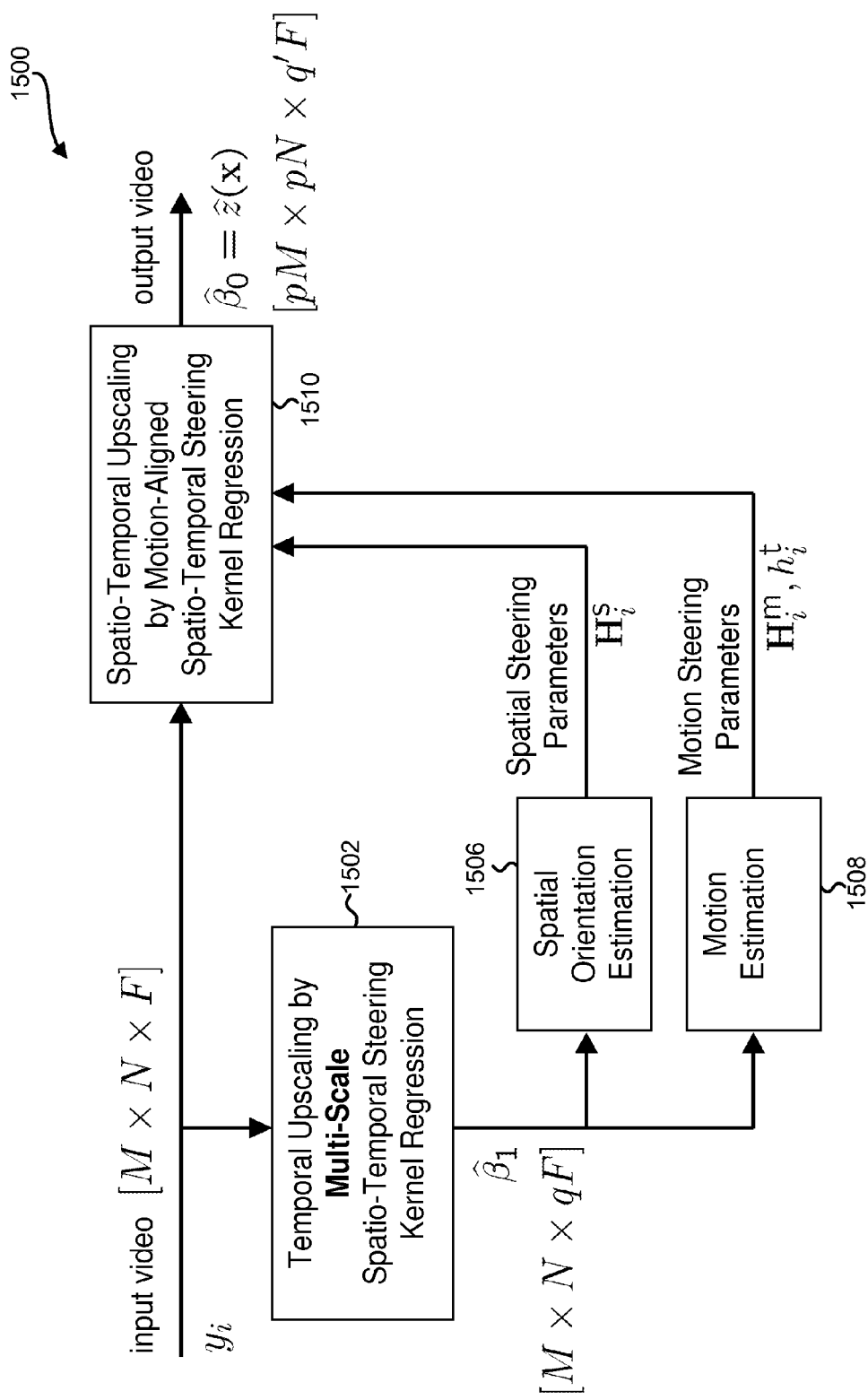
FIG. 15 illustrates another system for spatial and temporal video upscaling based on multi-scale spatio-temporal steering kernel regression.

The second multi-scale system 1500 is shown in FIG. 15. The input video $y_i$, at resolution M×N×F, is again shown at the top-left. As in the first system 1400, multi-scale spatio-temporal steering kernel regression 1502 (as described above) is used to perform temporal upscaling of the input video. However, in this system 1500 only the estimates of the gradients (derivatives) $\hat{\beta}_1$ at resolution M×N×qF are retained. Estimates of the video data itself ($\hat{\beta}_0$) are not utilized.

Subsequently, on the basis of $\hat{\beta}_1$, we estimate the spatial orientation parameters as well as spatio-temporal steering parameters, in particular local motion vectors $m_i$, for a subset of the video frames. We can use gradient-based methods for both orientation estimation and motion estimation, as described above. A component 1506 for performing spatial orientation estimation and a component 1508 for performing motion estimation are shown in FIG. 15. Again, spatial orientation estimation uses only spatial derivatives, while motion estimation uses spatial and temporal derivatives.

We estimate these steering parameters only for 1 out of every q frames, namely the frames that coincide temporally with the frames in the input video (i.e., not coincident with intermediate frames, temporally interpolated by the multi-scale pre-processing stage 1502). This estimation process, especially the estimation of motion vectors, may have an improved accuracy compared to estimation on the basis of the M×N×F input video data.

The main, final, upscaling stage 1510, shown at the top-right in FIG. 15, may be applied directly to the input video data $y_i$. This main upscaling stage 1510 may include both spatial, temporal, or spatial and temporal upscaling, and generates the final output with resolution pM×pN×q'F. Again, p is the desired spatial upscaling factor and q' is the desired temporal upscaling factor. This main upscaling stage 1510 is based on single-scale (multi-frame) spatio-temporal steering kernel regression. This stage 1510 uses the accurate estimates of the steering parameters as computed from the output of the multi-scale pre-processing stage 1502.

Note that motion vectors, i.e., frame-to-frame displacement vectors, were estimated on the basis of the temporally upscaled data sequence $\hat{\beta}_1$. Hence, these motion vectors $m_i$ are multiplied by a factor of q when provided to the final upscaling stage 1510. It may be advantageous to use the motion-aligned spatio-temporal steering kernel regression for the final video upscaling stage 1510, as described above.

This second overall system 1500 incorporates multi-scale processing to provide improved motion estimation and can provide improved video upscaling results. One potential advantage of the second system 1500 compared to the first system 1400 is that the final upscaling stage 1510 in the second system 1500 is applied directly to the input video data $y_i$. This may lead to higher visual quality, for example in terms of sharpness.

It is also noted that a subset of the components of the systems described already can be used to provide a multi-scale or multi-resolution method for estimation of 2-D motion in a video sequence. In other words, there are many video processing tasks that may not include upscaling but may require accurate motion estimation. These are such tasks as video filtering, restoration, compression, analysis, computer vision, etc. In particular, with reference to FIG. 15, we can use the temporal upscaling stage 1502 by multi-scale spatio-temporal steering kernel regression, followed by the motion estimation stage 1508 on a subset of frames. This in itself may provide accurate motion vector estimates that may be useful for other video processing tasks. In other words, this by itself may provide a novel motion estimation algorithm.

Figure 16:
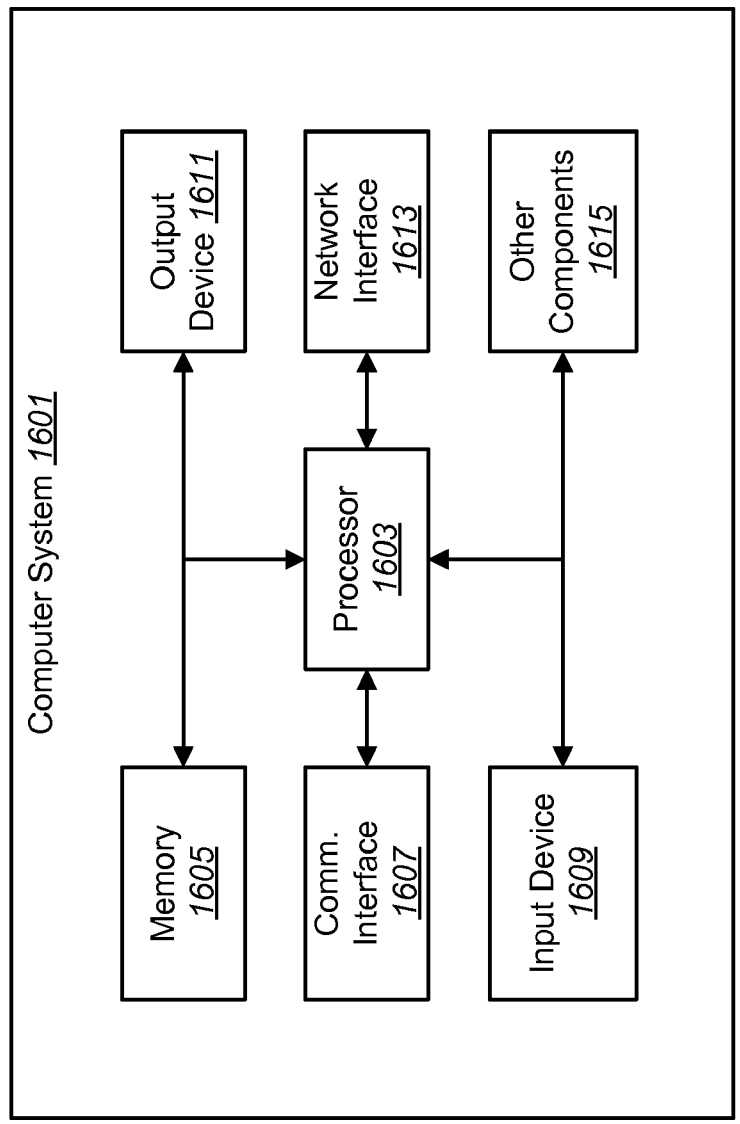
FIG. 16 illustrates various components that may be utilized in a computer system.

FIG. 16 illustrates various components that may be utilized in a computer system 1601. One or more computer systems 1601 may be used to implement the various systems and methods disclosed herein. The illustrated components may be located within the same physical structure or in separate housings or structures. Thus, the term computer or computer system 1601 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1601 is shown with a processor 1603 and memory 1605. The processor 1603 may control the operation of the computer system 1601 and may be embodied as a microprocessor, a microcontroller, a digital signal processor (DSP) or other device known in the art. The processor 1603 typically performs logical and arithmetic operations based on program instructions stored within the memory 1605. The instructions in the memory 1605 may be executable to implement the methods described herein.

The computer system 1601 may also include one or more communication interfaces 1607 and/or network interfaces 1613 for communicating with other electronic devices. The communication interface(s) 1607 and the network interface(s) 1613 may be based on wired communication technology, wireless communication technology, or both.

The computer system 1601 may also include one or more input devices 1609 and one or more output devices 1611. The input devices 1609 and output devices 1611 may facilitate user input. Other components 1615 may also be provided as part of the computer system 1601.

FIG. 16 illustrates only one possible configuration of a computer system 1601. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for temporal upscaling of video data, comprising:

repeatedly spatially downsampling input video data, thereby obtaining spatially downsampled video data at a coarsest spatial resolution scale;

temporally upscaling the spatially downsampled video data at the coarsest spatial resolution scale to generate an estimate of temporally upscaled video data at the coarsest spatial resolution scale;

spatially upscaling the estimate of temporally upscaled video data at the coarsest spatial resolution scale to generate an estimate of temporally upscaled video data at an intermediate spatial resolution; and spatially upscaling the estimate of temporally upscaled video data at the intermediate spatial resolution to generate an estimate of temporally upscaled video data at the original spatial resolution.

2. The method of claim 1, wherein the temporal upscaling is achieved using spatio-temporal steering kernel regression, and wherein the spatial upscaling is achieved using spatio-temporal steering kernel regression.

3. The method of claim 2, further comprising using the spatially downsampled video data at the coarsest spatial resolution scale to estimate steering parameters for the spatio-temporal steering kernel regression that is performed for the temporal upscaling.

4. The method of claim 2, further comprising using estimates of spatio-temporal gradient data to estimate steering parameters for the spatio-temporal steering kernel regression that is performed for the spatial upscaling.

5. The method of claim 1, wherein the spatial upscaling comprises:
merging the estimate of the temporally upscaled video data at a particular spatial resolution with the input video data at the next spatial resolution; and
interpolating missing pixels in intermediate frames.

6. The method of claim 2, further comprising using the multi-scale temporal upscaling process as a pre-processing stage to a subsequent upscaling stage.

7. The method of claim 6, wherein the multi-scale temporal upscaling process results in estimates of spatio-temporal gradient data, and further comprising:
using the estimates of the spatio-temporal gradient data to estimate steering parameters; and
spatially upscaling the estimate of the temporally upscaled video data at the original spatial resolution, wherein the spatial upscaling is achieved using spatio-temporal steering kernel regression, and wherein the estimated steering parameters are used for the spatio-temporal steering kernel regression.

8. The method of claim 6, wherein the multi-scale temporal upscaling process results in estimates of spatio-temporal gradient data, and further comprising:
using the estimates of the spatio-temporal gradient data to estimate steering parameters; and
spatially upscaling the input video data, wherein the spatial upscaling is achieved using spatio-temporal steering kernel regression, and wherein the estimated steering parameters are used for the spatio-temporal steering kernel regression.

9. The method of claim 1, further comprising using the multi-scale temporal upscaling process as a pre-processing stage to a subsequent upscaling stage.

10. The method of claim 9, further comprising:
using the output of the multi-scale temporal upscaling process to estimate motion vectors between frames of the temporally upscaled video data at the original spatial resolution; and
spatially upscaling the estimate of the temporally upscaled video data at the original spatial resolution, wherein the spatial upscaling is based on multiple video frames, and based on the estimated motion vectors.

11. The method of claim 9, further comprising:
using the output of the multi-scale temporal upscaling process to estimate motion vectors between frames of the input video data; and
spatially upscaling the input video data, wherein the spatial upscaling is based on multiple video frames, and based on the estimated motion vectors.

12. A computer system that is configured for temporal upscaling of video data, comprising:
a processor;
memory in electronic communication with the processor; and
instructions stored in the memory, the instructions being executable to:
repeatedly spatially downsample input video data, thereby obtaining spatially downsampled video data at a coarsest spatial resolution scale;
temporally upscale the spatially downsampled video data at the coarsest spatial resolution scale to generate an estimate of temporally upscaled video data at the coarsest spatial resolution scale;
spatially upscale the estimate of temporally upscaled video data at the coarsest spatial resolution scale to generate an estimate of temporally upscaled video data at an intermediate spatial resolution; and
spatially upscale the estimate of temporally upscaled video data at the intermediate spatial resolution to generate an estimate of temporally upscaled video data at the original spatial resolution.

13. The computer system of claim 12, wherein the temporal upscaling is achieved using spatio-temporal steering kernel regression, and wherein the spatial upscaling is achieved using spatio-temporal steering kernel regression.

14. The computer system of claim 13, wherein the instructions are also executable to use the spatially downsampled video data at the coarsest spatial resolution scale to estimate steering parameters for the spatio-temporal steering kernel regression that is performed for the temporal upscaling.

15. The computer system of claim 13, wherein the instructions are also executable to use estimates of spatio-temporal gradient data to estimate steering parameters for the spatio-temporal steering kernel regression that is performed for the spatial upscaling.

16. The computer system of claim 12, wherein the spatial upscaling comprises:
merging the estimate of the temporally upscaled video data at a particular spatial resolution with the input video data at the next spatial resolution; and
interpolating missing pixels in intermediate frames.

17. The computer system of claim 13, wherein the instructions are also executable to use the multi-scale temporal upscaling process as a pre-processing stage to a subsequent upscaling stage.

18. The computer system of claim 17, wherein the multi-scale temporal upscaling process results in estimates of spatio-temporal gradient data, and wherein the instructions are also executable to:
use the estimates of the spatio-temporal gradient data to estimate steering parameters; and
spatially upscale the estimate of the temporally upscaled video data at the original spatial resolution, wherein the spatial upscaling is achieved using spatio-temporal steering kernel regression, and wherein the estimated steering parameters are used for the spatio-temporal steering kernel regression.

19. The computer system of claim 17, wherein the multi-scale temporal upscaling process results in estimates of spatio-temporal gradient data, and wherein the instructions are also executable to:
use the estimates of the spatio-temporal gradient data to estimate steering parameters; and
spatially upscale the input video data, wherein the spatial upscaling is achieved using spatio-temporal steering kernel regression, and wherein the estimated steering parameters are used for the spatio-temporal steering kernel regression.

20. The computer system of claim 12, wherein the instructions are also executable to use the multi-scale temporal upscaling process as a pre-processing stage to a subsequent upscaling stage.

21. The computer system of claim 20, wherein the instructions are also executable to:
use the output of the multi-scale temporal upscaling process to estimate motion vectors between frames of the temporally upscaled video data at the original spatial resolution; and
spatially upscale the estimate of the temporally upscaled video data at the original spatial resolution, wherein the spatial upscaling is based on multiple video frames, and based on the estimated motion vectors.

22. The computer system of claim 20, wherein the instructions are also executable to:
use the output of the multi-scale temporal upscaling process to estimate motion vectors between frames of the input video data; and
spatially upscale the input video data, wherein the spatial upscaling is based on multiple video frames, and based on the estimated motion vectors.

23. A non-transitory computer-readable medium that facilitates temporal upscaling of video data, the computer-readable medium comprising executable instructions for:
repeatedly spatially downsampling input video data, thereby obtaining spatially downsampled video data at a coarsest spatial resolution scale;
temporally upscaling the spatially downsampled video data at the coarsest spatial resolution scale to generate an estimate of temporally upscaled video data at the coarsest spatial resolution scale;
spatially upscaling the estimate of temporally upscaled video data at the coarsest spatial resolution scale to generate an estimate of temporally upscaled video data at an intermediate spatial resolution; and
spatially upscaling the estimate of temporally upscaled video data at the intermediate spatial resolution to generate an estimate of temporally upscaled video data at the original spatial resolution.

24. The computer-readable medium of claim 23, wherein the temporal upscaling is achieved using spatio-temporal steering kernel regression, and wherein the spatial upscaling is achieved using spatio-temporal steering kernel regression.

25. The computer-readable medium of claim 24, wherein the instructions are also executable for using the spatially downsampled video data at the coarsest spatial resolution scale to estimate steering parameters for the spatio-temporal steering kernel regression that is performed for the temporal upscaling.

26. The computer-readable medium of claim 24, wherein the instructions are also executable for using estimates of spatio-temporal gradient data to estimate steering parameters for the spatio-temporal steering kernel regression that is performed for the spatial upscaling.

27. The computer-readable medium of claim 23, wherein the spatial upscaling comprises:
merging the estimate of the temporally upscaled video data at a particular spatial resolution with the input video data at the next spatial resolution; and
interpolating missing pixels in intermediate frames.

28. The computer-readable medium of claim 24, wherein the instructions are also executable for using the multi-scale temporal upscaling process as a pre-processing stage to a subsequent upscaling stage.

29. The computer-readable medium of claim 28, wherein the multi-scale temporal upscaling process results in estimates of spatio-temporal gradient data, and wherein the instructions are also executable for:
using the estimates of the spatio-temporal gradient data to estimate steering parameters; and
spatially upscaling the estimate of the temporally upscaled video data at the original spatial resolution, wherein the spatial upscaling is achieved using spatio-temporal steering kernel regression, and wherein the estimated steering parameters are used for the spatio-temporal steering kernel regression.

30. The computer-readable medium of claim 28, wherein the multi-scale temporal upscaling process results in estimates of spatio-temporal gradient data, and wherein the instructions are also executable for:
using the estimates of the spatio-temporal gradient data to estimate steering parameters; and
spatially upscaling the input video data, wherein the spatial upscaling is achieved using spatio-temporal steering kernel regression, and wherein the estimated steering parameters are used for the spatio-temporal steering kernel regression.

31. The computer-readable medium of claim 23, wherein the instructions are also executable for using the multi-scale temporal upscaling process as a pre-processing stage to a subsequent upscaling stage.

32. The computer-readable medium of claim 31, wherein the instructions are also executable for:
using the output of the multi-scale temporal upscaling process to estimate motion vectors between frames of the temporally upscaled video data at the original spatial resolution; and
spatially upscaling the estimate of the temporally upscaled video data at the original spatial resolution, wherein the spatial upscaling is based on multiple video frames, and based on the estimated motion vectors.

33. The computer-readable medium of claim 31, wherein the instructions are also executable for:
using the output of the multi-scale temporal upscaling process to estimate motion vectors between frames of the input video data; and
spatially upscaling the input video data, wherein the spatial upscaling is based on multiple video frames, and based on the estimated motion vectors.

* * * * *